(12) United States Patent
Huang et al.

(10) Patent No.: US 12,231,221 B1
(45) Date of Patent: Feb. 18, 2025

(54) METHOD AND APPARATUS FOR UL SYNCHRONIZATION HANDLING FOR SATELLITE SWITCH IN A WIRELESS COMMUNICATION SYSTEM

(71) Applicant: ASUS Technology Licensing Inc., Taipei (TW)

(72) Inventors: Yi-Hsuan Huang, Taipei (TW); Meng-Hui Ou, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/830,376

(22) Filed: Sep. 10, 2024

Related U.S. Application Data

(60) Provisional application No. 63/545,290, filed on Oct. 23, 2023, provisional application No. 63/537,728, filed on Sep. 11, 2023, provisional application No. 63/537,759, filed on Sep. 11, 2023.

(51) Int. Cl.
*H04W 56/00* (2009.01)
*H04B 7/185* (2006.01)

(52) U.S. Cl.
CPC .... *H04B 7/18541* (2013.01); *H04W 56/0045* (2013.01)

(58) Field of Classification Search
CPC ......... H04W 36/00837; H04W 36/083; H04W 36/249; H04W 76/20; H04W 84/06; H04W 56/0045; H04B 7/18541

USPC .......................................................... 370/329
See application file for complete search history.

(56) References Cited

U.S. PATENT DOCUMENTS

| | | | |
|---|---|---|---|
| 10,420,047 B2 * | 9/2019 | Lu | H04W 24/04 |
| 11,856,631 B1 * | 12/2023 | Huang | H04W 36/249 |
| 2019/0075597 A1 * | 3/2019 | Yerramalli | H04L 5/0091 |
| 2020/0084819 A1 * | 3/2020 | Abedini | H04W 76/15 |
| 2023/0397061 A1 * | 12/2023 | Huang | H04W 36/0061 |

FOREIGN PATENT DOCUMENTS

CN 117917127 A 4/2024

* cited by examiner

*Primary Examiner* — Robert J Lopata
(74) *Attorney, Agent, or Firm* — Skaar Ulbrich Macari, P.A.

(57) ABSTRACT

Methods, systems, and apparatuses are provided for Uplink (UL) synchronization handling for satellite switching in a wireless communication system. As such, a User Equipment (UE) can handle UL synchronization for satellite switching, thereby avoiding reducing transmission efficiency. The UE can also handle resources and/or configurations properly during satellite switching. A method for a UE comprises receiving, from an upper layer, an indication of an uplink synchronization loss, and in response to receiving the indication of the uplink synchronization loss: not performing uplink transmission on a serving cell, and determining whether to flush one or more Hybrid Automatic Repeat Request (HARQ) buffers based on whether the uplink synchronization loss is due to a satellite switch.

16 Claims, 20 Drawing Sheets

METHOD AND APPARATUS FOR UL SYNCHRONIZATION HANDLING FOR SATELLITE SWITCH IN A WIRELESS COMMUNICATION SYSTEM

CROSS-REFERENCE TO RELATED APPLICATIONS

The present Application claims priority to and the benefit of U.S. Provisional Patent Application Ser. No. 63/537,728, filed Sep. 11, 2023, U.S. Provisional Patent Application Ser. No. 63/537,759, filed Sep. 11, 2023, and U.S. Provisional Patent Application Ser. No. 63/545,290, filed Oct. 23, 2023; with each of the referenced applications and disclosures fully incorporated herein by reference.

FIELD

This disclosure generally relates to wireless communication networks and, more particularly, to a method and apparatus for Uplink (UL) synchronization handling for satellite switching in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for Uplink (UL) synchronization handling for satellite switching in a wireless communication system. As such, a User Equipment (UE) can handle UL synchronization for satellite switching, thereby avoiding reducing transmission efficiency. The UE can also handle resources and/or configurations properly during satellite switching.

In various embodiments, a method for a UE in a wireless communication system comprises receiving, from an upper layer, an indication of an uplink synchronization loss, and in response to receiving the indication of the uplink synchronization loss: not performing uplink transmission on a serving cell, and determining whether to flush one or more Hybrid Automatic Repeat Request (HARQ) buffers based on whether the uplink synchronization loss is due to a satellite switch.

In various embodiments, a method for a UE in a wireless communication system comprises receiving a system information, wherein the system information includes at least a first Non-Terrestrial Network (NTN) configuration, a time information, and an indication for a satellite switch, starting or restarting a timer based on the first NTN configuration, in response to receiving the system information, initiating a procedure of satellite switch based on the indication for the satellite switch being included in the system information, stopping the timer upon a timing indicated by the time information, considering Uplink (UL) synchronization is lost, after stopping the timer, determining whether to flush one or more HARQ buffers based on whether the UL synchronization is lost due to satellite switch, performing Downlink (DL) synchronization with a cell served by a satellite indicated in the indication for the satellite switch, starting the timer based on a second NTN configuration included in the indication for the satellite switch, after performing the DL synchronization, and considering the UL synchronization is obtained, after starting the timer.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.300 V17.5.0, "NR, NR and NG-RAN Overall Description, Stage 2"; [2] 3GPP TS 38.211 V17.5.0, "NR, Physical channels and modulation"; [3] 3GPP TS 38.321 V17.5.0, "NR, MAC protocol specification"; [4] 3GPP TS 38.331 V17.5.0, "NR, RRC protocol specification"; [5] R2-2309341, "Stage 3 Running RRC CR for NR NTN Rel-18"; [6] R2-2308373, "Satellite Switch: PCI change without L3 handover," NEC; [7] R2-2304273, "LS on unchanged PCI"; [8] R2-2307623, "Details on satellite switch with PCI unchanged," Qualcomm; [9] 3GPP TS 38.331 V17.6.0, "NR, RRC protocol specification"; and [10] R2-2310307, "Satellite switching with unchanged PCI", Apple. The standards and documents listed above are hereby expressly and fully incorporated herein by reference in their entirety.

Figure 1:
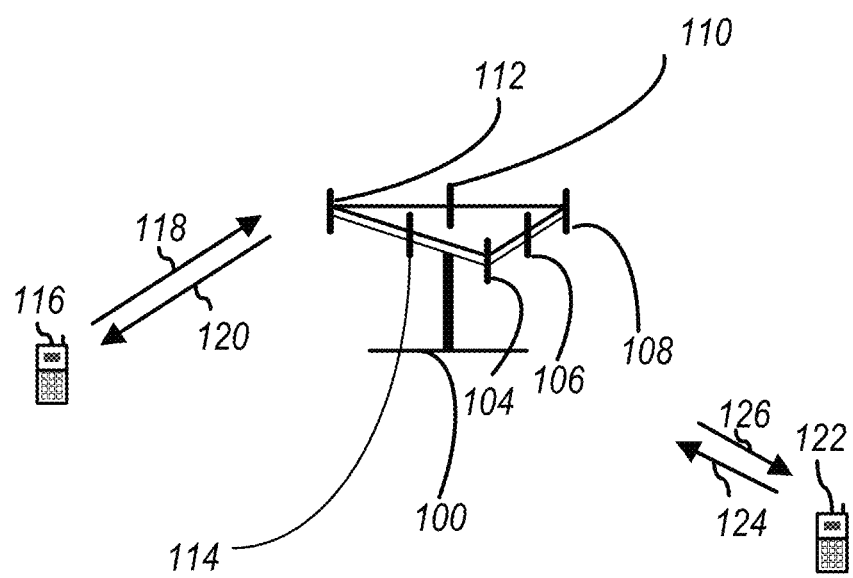
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, a gNB, or some other terminology. The AT may also be called User Equipment (UE), a wireless communication device, terminal, access terminal or some other terminology.

Figure 2:
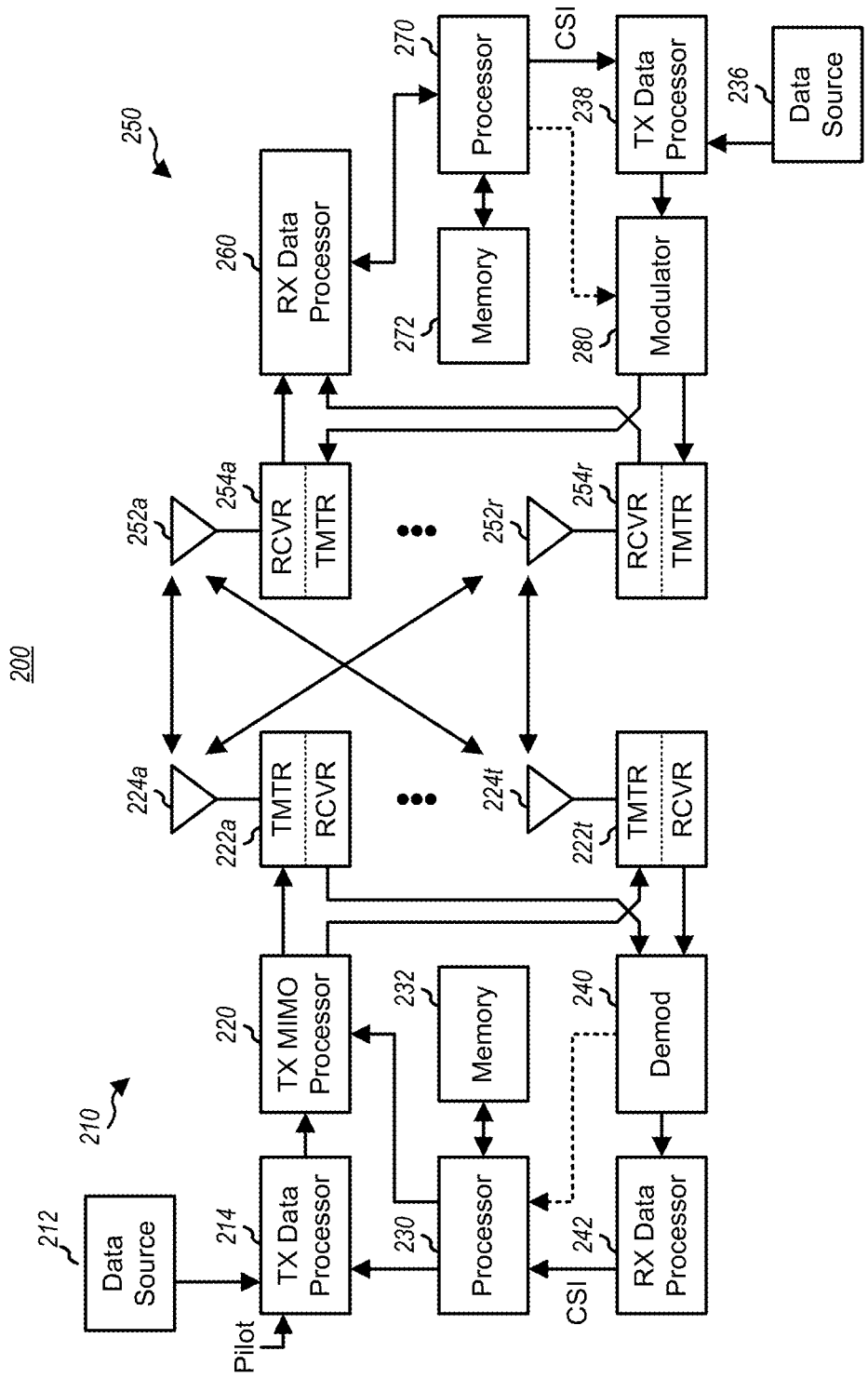
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide NT"detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
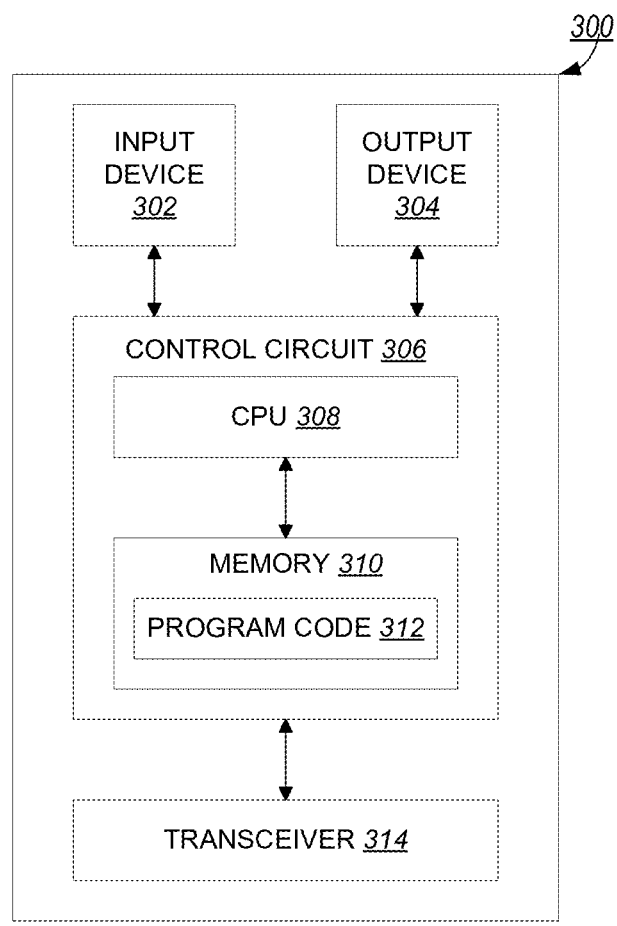
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the $N_R$ system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
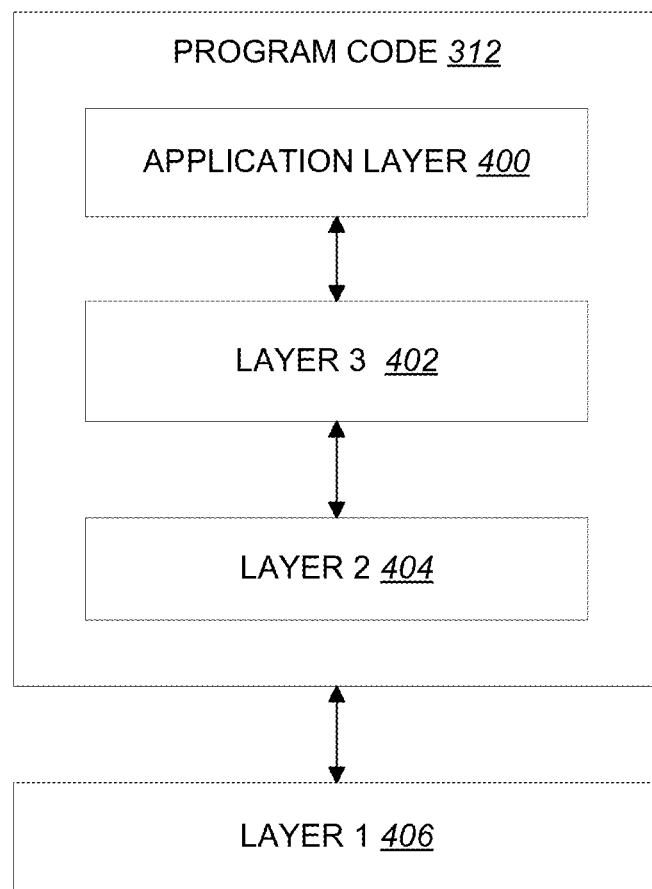
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or $N_R$ systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The general description of Rel-17 $N_R$ non-terrestrial networks (NTN) is specified in TS 38.300 ([1]3GPP TS 38.300 V17.5.0) as below:

Quotation Start [1]

16.14 Non-Terrestrial Networks
16.14.1 Overview

Figure 16:
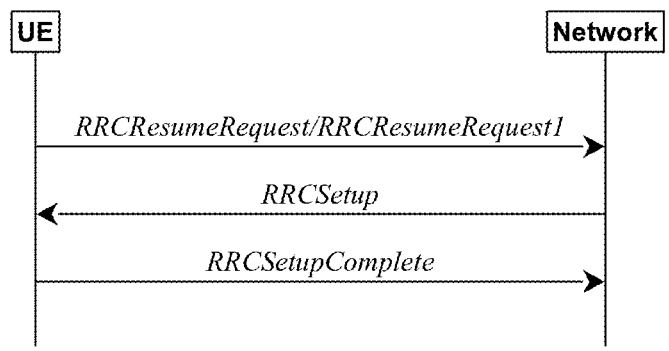
FIG. 16 is a reproduction of FIG. 5.3.13.1-2: RRC connection resume fallback to RRC connection establishment, successful, from 3GPP TS 38.331 V17.5.0.

FIG. 16.14.1-1 below illustrates an example of a Non-Terrestrial Network (NTN) providing non-terrestrial NR access to the UE by means of an NTN payload and an NTN Gateway, depicting a service link between the NTN payload and a UE, and a feeder link between the NTN Gateway and the NTN payload.

Figure 5:
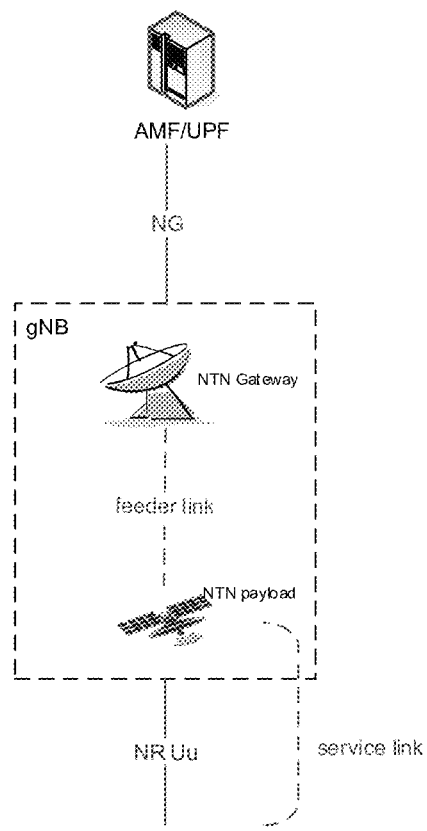
FIG. 5 is a reproduction of FIG. 16.14.1-1: Overall illustration of an NTN, from 3GPP TS 38.300 V17.5.0.

FIG. 5 is a Reproduction of FIG. 16.14.1-1: Overall Illustration of an NTN, from 3GPP TS 38.300 V17.5.0.

. . .

The NTN payload transparently forwards the radio protocol received from the UE (via the service link) to the NTN Gateway (via the feeder link) and vice-versa. The following connectivity is supported by the NTN payload:
  An NTN gateway may serve multiple NTN payloads;
  An NTN payload may be served by multiple NTN gateways.

. . .

Three types of service links are supported:
Earth-fixed: provisioned by beam(s) continuously covering the same geographical areas all the time (e.g., the case of GSO satellites);
Quasi-Earth-fixed: provisioned by beam(s) covering one geographic area for a limited period and a different geographic area during another period (e.g., the case of NGSO satellites generating steerable beams);
Earth-moving: provisioned by beam(s) whose coverage area slides over the Earth surface (e.g., the case of NGSO satellites generating fixed or non-steerable beams).

With NGSO satellites, the gNB can provide either quasi-Earth-fixed service link or Earth-moving service link, while gNB operating with GSO satellite can provide Earth fixed service link.

In this release, the UE supporting NTN is GNSS-capable.
16.14.2 Timing and Synchronization
16.14.2.1 Scheduling and Timing DL and UL are frame aligned at the uplink time synchronization reference point (RP) with an offset given by $N_{TA,offset}$ (see clause 4.2 of TS 38.213).

To accommodate the propagation delay in NTNs, several timing relationships are enhanced by a Common Timing Advance (Common TA) and two offsets $K_{offset}$ and $k_{mac}$:
  Common TA is a configured timing offset that is equal to the RTT between the RP and the NTN payload.
  $K_{offset}$ is a configured scheduling offset that needs to be larger or equal to the sum of the service link RTT and the Common TA.
  $k_{mac}$ is a configured offset that is approximately equal to the RTT between the RP and the gNB.

The scheduling offset $K_{offset}$ is used to allow the UE sufficient processing time between a downlink reception and an uplink transmission, see TS 38.213.

The offset $k_{mac}$ is used to delay the application of a downlink configuration indicated by a MAC CE command on PDSCH, see TS 38.213, and in estimation of UE-gNB RTT, see TS 38.321 [3]. It may be provided by the network when downlink and uplink frame timing are not aligned at gNB. The $k_{mac}$ is also used in the random access procedure, to determine the start time of RAR window/MsgB window after a Msg1/MsgA transmission (see TS 38.213).

The Service link RTT, Feeder link RTT, RP, Common TA, $k_{mac}$ and $T_{TA}$ (see clause 16.14.2.2) are illustrated in FIG. 16.14.2.1-1.

Figure 6:
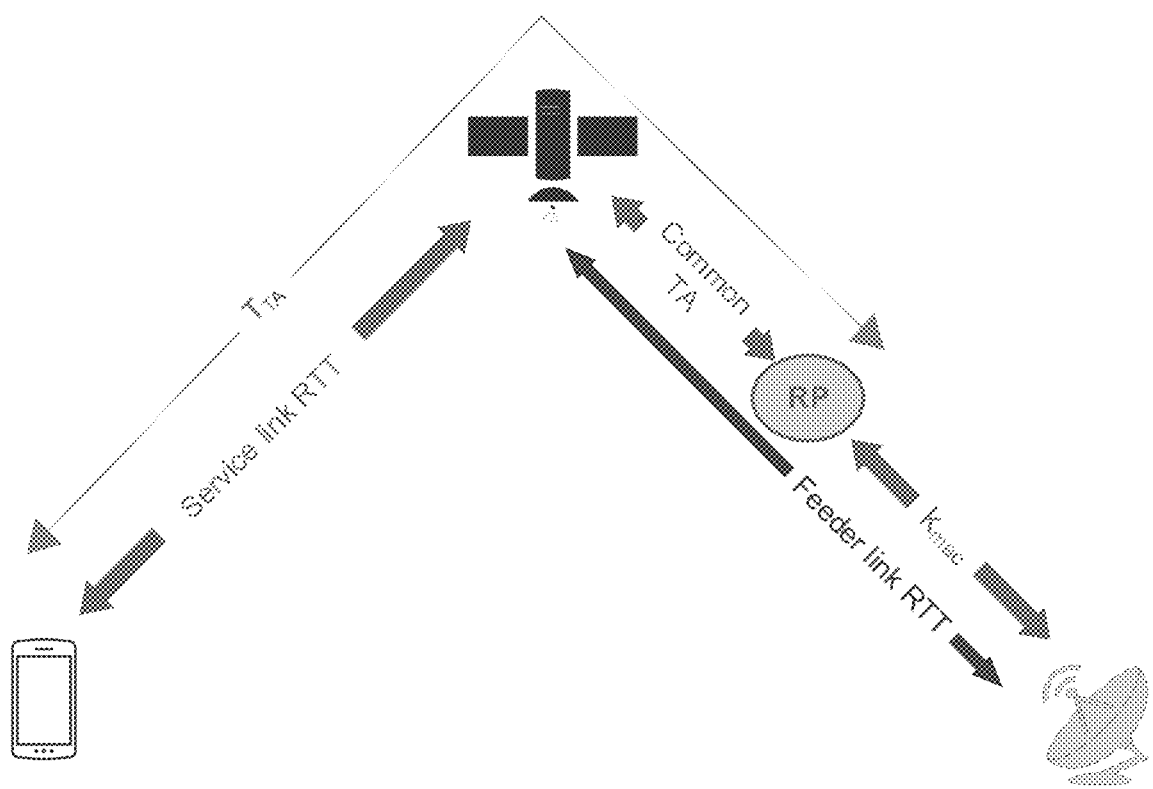
FIG. 6 is a reproduction of FIG. 16.14.2.1-1: Illustration of timing relationship (for collocated gNB and NTN Gateway), from 3GPP TS 38.300 V17.5.0.

FIG. 6 is a Reproduction of FIG. 16.14.2.1-1: Illustration of Timing Relationship (for Collocated gNB and NTN Gateway), from 3GPP TS 38.300 V17.5.0.

. . .

16.14.2.2 Timing Advance and Frequency Pre-Compensation

For the serving cell, the network broadcast valid ephemeris information and Common TA parameters. The UE shall have valid GNSS position as well as ephemeris and Common TA before connecting to an NTN cell. To achieve synchronisation, before and during connection to an NTN cell, the UE shall compute the RTT between UE and the RP based on the GNSS position, the ephemeris, and the Common TA parameters (see clause 4.2 in TS 38.213), and autonomously pre-compensate the $T_{TA}$ for the RTT between the UE and the RP as illustrated in FIG. 16.14.2.1-1 (see clause 4.3 of TS 38.211 [2]).

The UE shall compute the frequency Doppler shift of the service link, and autonomously pre-compensate for it in the uplink transmissions, by considering UE position and the ephemeris. If the UE does not have a valid GNSS position and/or valid ephemeris and Common TA, it shall not transmit until both are regained.

In connected mode, the UE shall be able to continuously update the Timing Advance and frequency pre-compensation.

The UE may be configured to report Timing Advance during Random Access procedures or in connected mode. In connected mode, event-triggered reporting of the Timing Advance is supported.

Quotation End

The general description of timing advance (TA) is specified in TS 38.300 ([1] from 3GPP TS 38.300 V17.5.0) as below:

Quotation Start [1]

9.2.9 Timing Advance

In RRC_CONNECTED, the gNB is responsible for maintaining the timing advance to keep the L1 synchronised. Serving cells having UL to which the same timing advance applies and using the same timing reference cell are grouped in a TAG. Each TAG contains at least one serving cell with configured uplink, and the mapping of each serving cell to a TAG is configured by RRC.

For the primary TAG the UE uses the PCell as timing reference, except with shared spectrum channel access where an SCell can also be used in certain cases (see clause 7.1, TS 38.133). In a secondary TAG, the UE may use any of the activated SCells of this TAG as a timing reference cell, but should not change it unless necessary.

Timing advance updates are signalled by the gNB to the UE via MAC CE commands. Such commands restart a TAG-specific timer which indicates whether the L1 can be synchronised or not: when the timer is running, the L1 is considered synchronised, otherwise, the L1 is considered non-synchronised (in which case uplink transmission can only take place through MSG1/MSGA).

Quotation End

The TA information comprising definition and formula to calculate TA parameter are specified in TS 38.211 ([2] 3GPP TS 38.211 V17.5.0) as below:

Quotation Start [2]

4.3 Frame Structure
4.3.1 Frames and Subframes
Downlink, uplink, and sidelink transmissions are organized into frames with $T_f=(\Delta f_{max} N_f/100) \cdot T_c=10$ ms duration, each consisting of ten subframes of $T_{sf}=(\Delta f_{max}N_f/1000) \cdot T_c=1$ ms duration. The number of consecutive OFDM symbols per subframe is $N_{symb}^{subframe,\mu}= N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset}+N_{TA,adj}^{common}+N_{TA,adj}^{UE})T_c$ before the start of the corresponding downlink frame at the UE where $N_{TA}$ and $N_{TA,offset}$ are given by clause 4.2 of [TS 38.213], except for msgA transmission on PUSCH where $N_{TA}=0$ shall be used;

$N_{TA,adj}^{common}$ given by clause 4.2 of [TS 38.213] is derived from the higher-layer parameters ta-Common, ta-CommonDrift, and ta-CommonDriftVariant if configured, otherwise $N_{TA,adj}^{common}=0$;

$N_{TA,adj}^{UE}$ given by clause 4.2 of [TS 38.213] is computed by the UE based on UE position and serving-satellite-ephemeris-related higher-layers parameters if configured, otherwise $N_{TA,adj}^{UE}=0$.

Figure 7:
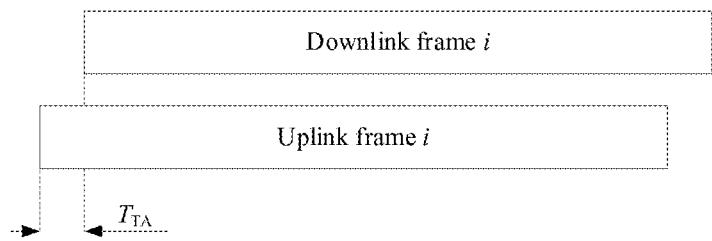
FIG. 7 is a reproduction of FIG. 4.3.1-1: Uplink-downlink timing relation, from 3GPP TS 38.211 V17.5.0.

FIG. 7 is a Reproduction of FIG. 4.3.1-1: Uplink-Downlink Timing Relation, from 3GPP TS 38.211 V17.5.0.

Quotation End

The maintenance of UL time alignment and TA reporting in NTN is specified in TS 38.321 ([3] 3GPP TS 38.321 V17.5.0) as below:

Quotation Start [3]

5.2 Maintenance of Uplink Time Alignment
RRC configures the following parameters for the maintenance of UL time alignment:
  timeAlignmentTimer (per TAG) which controls how long the MAC entity considers the Serving Cells belonging to the associated TAG to be uplink time aligned;
. . .
The MAC entity shall:
1>when a Timing Advance Command MAC CE is received, and if an $N_{TA}$ (as defined in TS 38.211 [2]) has been maintained with the indicated TAG:
  2>apply the Timing Advance Command for the indicated TAG;
. . .
    3>start or restart the timeAlignmentTimer associated with the indicated TAG.
1>when a Timing Advance Command is received in a Random Access Response message for a Serving Cell belonging to a TAG or in a MSGB for an SpCell:
  2>if the Random Access Preamble was not selected by the MAC entity among the contention-based Random Access Preamble:
    3>apply the Timing Advance Command for this TAG;
    3>start or restart the timeAlignmentTimer associated with this TAG.
  2>else if the timeAlignmentTimer associated with this TAG is not running:
    3>apply the Timing Advance Command for this TAG;
    3>start the timeAlignmentTimer associated with this TAG;
    3>when the Contention Resolution is considered not successful as described in clause 5.1.5; or
    3>when the Contention Resolution is considered successful for SI request as described in clause 5.1.5, after transmitting HARQ feedback for MAC PDU including UE Contention Resolution Identity MAC CE:
      4>stop timeAlignmentTimer associated with this TAG.
. . .
  2>else:
    3>ignore the received Timing Advance Command.
1>when an Absolute Timing Advance Command is received in response to a MSGA transmission including C-RNTI MAC CE as specified in clause 5.1.4a:
  2>apply the Timing Advance Command for PTAG;
  2>if there is ongoing Positioning SRS Transmission in RRC_INACTIVE as in clause 5.26:
    3>start or restart the inactivePosSRS-TimeAlignmentTimer associated with the indicated TAG.
. . .
    3>start or restart the timeAlignmentTimer associated with PTAG.
. . .
1>when instruction from the upper layer has been received for starting the TimeAlignmentTimer associated with PTAG:
  2>start the TimeAlignmentTimer associated with PTAG.
1>when a timeAlignmentTimer expires:
  2>if the timeAlignmentTimer is associated with the PTAG:
    3>flush all HARQ buffers for all Serving Cells;
    3>notify RRC to release PUCCH for all Serving Cells, if configured;
    3>notify RRC to release SRS for all Serving Cells, if configured;
    3>clear any configured downlink assignments and configured uplink grants;
    3>clear any PUSCH resource for semi-persistent CSI reporting;
    3>consider all running timeAlignmentTimers as expired;
    3>maintain $N_{TA}$ (defined in TS 38.211 [2]) of all TAGs.

2>else if the timeAlignmentTimer is associated with an STAG, then for all Serving Cells belonging to this TAG:
3>flush all HARQ buffers;
3>notify RRC to release PUCCH, if configured;
3>notify RRC to release SRS, if configured;
3>clear any configured downlink assignments and configured uplink grants;
3>clear any PUSCH resource for semi-persistent CSI reporting;
3>maintain $N_{TA}$ (defined in TS 38.211 [2]) of this TAG.
. . .

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

The MAC entity shall not perform any uplink transmission on a Serving Cell except the Random Access Preamble and MSGA transmission when the timeAlignmentTimer associated with the TAG to which this Serving Cell belongs is not running, CG-SDT procedure is not ongoing and SRS transmission in RRC_INACTIVE as in clause 5.26 is not on-going. Furthermore, when the timeAlignmentTimer associated with the PTAG is not running, CG-SDT procedure is not ongoing and SRS transmission in RRC_INACTIVE as in clause 5.26 is not ongoing, the MAC entity shall not perform any uplink transmission on any Serving Cell except the Random Access Preamble and MSGA transmission on the SpCell. The MAC entity shall not perform any uplink transmission except the Random Access Preamble and MSGA transmission when the cg-SDT-TimeAlignment-Timer is not running during the ongoing CG-SDT procedure as triggered in clause 5.27 and the inactivePosSRS-TimeAlignmentTimer is not running.

Next Quotation 5.4.8 Timing Advance Reporting

The Timing Advance reporting procedure is used in a non-terrestrial network to provide the gNB with an estimate of the UE's Timing Advance value (i.e., $T_{TA}$ as defined in the UE's TA formula, see TS 38.211 [2] clause 4.3.1).

RRC controls Timing Advance reporting by configuring the following parameters:
offsetThresholdTA;
timingAdvanceSR.

A Timing Advance report (TAR) shall be triggered if any of the following events occur:
upon indication from upper layers to trigger a Timing Advance report;
upon configuration of offsetThresholdTA by upper layers, if the UE has not previously reported Timing Advance value to current Serving Cell;
if the variation between the current estimate of the Timing Advance value and the last reported Timing Advance value is equal to or larger than offsetThresholdTA, if configured.

The MAC entity shall:
1>if the Timing Advance reporting procedure determines that at least one TAR has been triggered and not cancelled:
2>if UL-SCH resources are available for a new transmission and the UL-SCH resources can accommodate the Timing Advance Report MAC CE plus its subheader as a result of logical channel prioritization:
3>instruct the Multiplexing and Assembly procedure to generate the Timing Advance Report MAC CE as defined in clause 6.1.3.56.
2>else
3>if timingAdvanceSR is configured with value enabled:
4>trigger a Scheduling Request.
NOTE: UL-SCH resources are considered available if the MAC entity has been configured with, receives, or determines an uplink grant. If the MAC entity has determined at a given point in time that UL-SCH resources are available, this need not imply that UL-SCH resources are available for use at that point in time.

A MAC PDU shall contain at most one Timing Advance Report MAC CE, even when multiple events have triggered a Timing Advance report. The Timing Advance Report MAC CE shall be generated based on the latest available estimate of the UE's Timing Advance value prior to the MAC PDU assembly.

All triggered Timing Advance reports shall be cancelled when a MAC PDU is transmitted and this PDU includes a Timing Advance Report MAC CE.

Next Quotation 6.1.3.4 Timing Advance Command MAC CE

The Timing Advance Command MAC CE is identified by MAC subheader with LCID as specified in Table 6.2.1-1.

It has a fixed size and consists of a single octet defined as follows (FIG. 6.1.3.4-1):

TAG Identity (TAG ID): This field indicates the TAG Identity of the addressed TAG. The TAG containing the SpCell has the TAG Identity 0. The length of the field is 2 bits;

Timing Advance Command: This field indicates the index value $T_A$ (0, 1, 2 . . . 63) used to control the amount of timing adjustment that MAC entity has to apply (as specified in TS 38.213). The length of the field is 6 bits.

Figure 8:
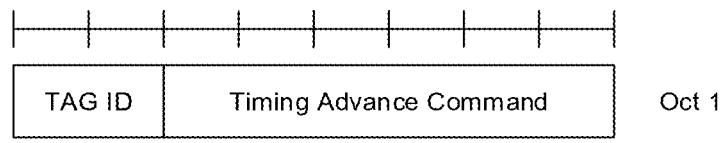
FIG. 8 is a reproduction of FIG. 6.1.3.4-1: Timing Advance Command MAC CE, from 3GPP TS 38.321 V17.5.0.

FIG. 8 is a Reproduction of FIG. 6.1.3.4-1: Timing Advance Command MAC CE, from 3GPP TS 38.321 V17.5.0.

Next Quotation 6.1.3.56 Timing Advance Report MAC CE

The Timing Advance Report MAC CE is identified by MAC subheader with LCID as specified in Table 6.2.1-2. It has a fixed size and consists of two octets defined as follows (FIG. 6.1.3.56-1):

R: Reserved bit, set to 0;

Timing Advance: In FR1, the Timing Advance field indicates the least integer number of slots, using subcarrier spacing of 15 kHz, greater than or equal to the Timing Advance value (see TS 38.211 [2], clause 4.3.1). The length of the field is 14 bits.

Figure 9:
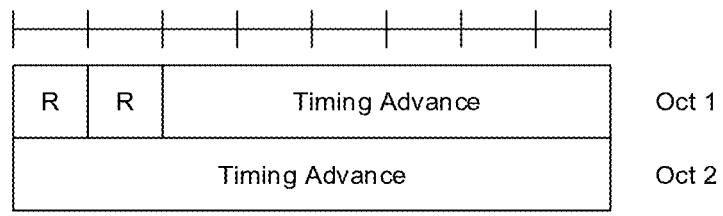
FIG. 9 is a reproduction of FIG. 6.1.3.56-1: Timing Advance Report MAC CE, from 3GPP TS 38.321 V17.5.0.

FIG. 9 is a Reproduction of FIG. 6.1.3.56-1: Timing Advance Report MAC CE, from 3GPP TS 38.321 V17.5.0.

Quotation End

The RRC connection/reconfiguration procedure and TA reporting procedure in upper layer (i.e. RRC) are specified in TS 38.331 ([4] 3GPP TS 38.331 V17.5.0) as below:

Quotation Start [4]

Figure 10:
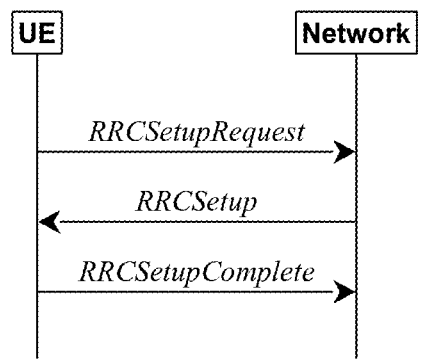
FIG. 10 is a reproduction of FIG. 5.3.3.1-1: RRC connection establishment, successful, from 3GPP TS 38.331 V17.5.0.

5.3.3 RRC Connection Establishment
5.3.3.1 General
FIG. 10 is a Reproduction of FIG. 5.3.3.1-1: RRC Connection Establishment, Successful, from 3GPP TS 38.331 V17.5.0.

The purpose of this procedure is to establish an RRC connection. RRC connection establishment involves SRB1 establishment. The procedure is also used to transfer the initial NAS dedicated information/message from the UE to the network.

The network applies the procedure e.g. as follows:
When establishing an RRC connection;
When UE is resuming or re-establishing an RRC connection, and the network is not able to retrieve or verify the UE context. In this case, UE receives RRCSetup and responds with RRCSetupComplete.

. . .

5.3.3.2 Initiation
The UE initiates the procedure when upper layers request establishment of an RRC connection while the UE is in RRC_IDLE and it has acquired essential system information, or for sidelink communication as specified in clause 5.3.3.1a.

The UE shall ensure having valid and up to date essential system information as specified in clause 5.2.2.2 before initiating this procedure.

Upon initiation of the procedure, the UE shall:
. . .
2>apply the default MAC Cell Group configuration as specified in 9.2.2;
2>apply the CCCH configuration as specified in 9.1.1.2;
2>apply the timeAlignmentTimerCommon included in SIB1;
1>start timer T300;
1>initiate transmission of the RRCSetupRequest message in accordance with 5.3.3.3;

5.3.3.3 Actions Related to Transmission of RRCSetupRequest Message
The UE shall set the contents of RRCSetupRequest message as follows:
. . .
1>if ta-Report is configured with value enabled and the UE supports TA reporting:
2>indicate TA report initiation to lower layers;
The UE shall submit the RRCSetupRequest message to lower layers for transmission.

Next Quotation

Figure 11:
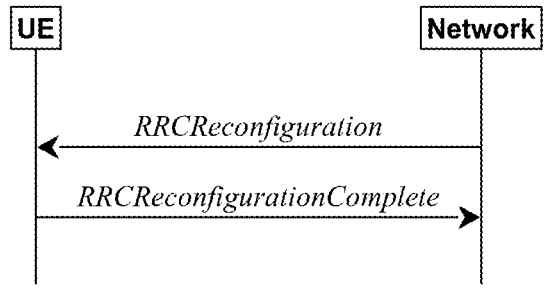
FIG. 11 is a reproduction of FIG. 5.3.5.1-1: RRC reconfiguration, successful, from 3GPP TS 38.331 V17.5.0.
Figure 12:
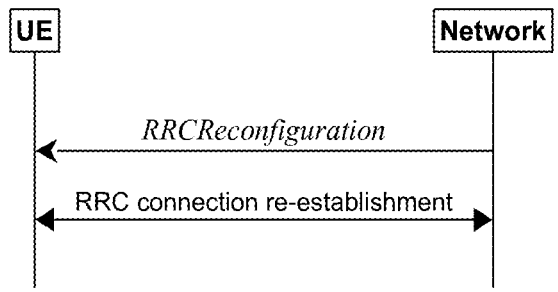
FIG. 12 is a reproduction of FIG. 5.3.5.1-2: RRC reconfiguration, failure, from 3GPP TS 38.331 V17.5.0.

5.3.5 RRC Reconfiguration
5.3.5.1 General
FIG. 11 is a Reproduction of FIG. 5.3.5.1-1: RRC Reconfiguration, Successful, from 3GPP TS 38.331 V17.5.0.
FIG. 12 is a Reproduction of FIG. 5.3.5.1-2: RRC Reconfiguration, Failure, from 3GPP TS 38.331 V17.5.0.

The purpose of this procedure is to modify an RRC connection, e.g. to establish/modify/release RBs/BH RLC channels/Uu Relay RLC channels/PC5 Relay RLC channels, to perform reconfiguration with sync, to setup/modify/release measurements, to add/modify/release SCells and cell groups, to add/modify/release conditional handover configuration, to add/modify/release conditional PSCell change or conditional PSCell addition configuration. As part of the procedure, NAS dedicated information may be transferred from the Network to the UE.

. . .

5.3.5.2 Initiation
The Network may initiate the RRC reconfiguration procedure to a UE in RRC_CONNECTED. The Network applies the procedure as follows:
the establishment of RBs (other than SRB1, that is established during RRC connection establishment) is performed only when AS security has been activated;
. . .
the reconfigurationWithSync is included in masterCellGroup only when AS security has been activated, and SRB2 with at least one DRB or multicast MRB or, for IAB, SRB2, are setup and not suspended;
the conditionalReconfiguration for CPC is included only when at least one RLC bearer is setup in SCG;
the conditionalReconfiguration for CHO or CPA is included only when AS security has been activated, and SRB2 with at least one DRB or multicast MRB or, for IAB, SRB2, are setup and not suspended.

5.3.5.3 Reception of an RRCReconfiguration by the UE
The UE shall perform the following actions upon reception of the RRCReconfiguration, or upon execution of the conditional reconfiguration (CHO, CPA or CPC):
. . .
1>if the RRCReconfiguration includes the masterCellGroup:
2>perform the cell group configuration for the received masterCellGroup according to 5.3.5.5;
. . .
1>if the RRCReconfiguration message includes the conditionalReconfiguration:
2>perform conditional reconfiguration as specified in 5.3.5.13;
. . .
1>else (RRCReconfiguration was received via SRB1):
. . .
2>if the reconfigurationWithSync was included in spCellConfig of an MCG:
3>if ta-Report is configured with value enabled and the UE supports TA reporting:
4>indicate TA report initiation to lower layers;
2>submit the RRCReconfigurationComplete message via SRB1 to lower layers for transmission using the new configuration;

Next Quotation

Figure 13:
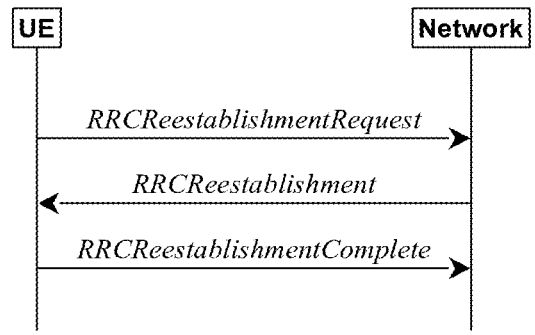
FIG. 13 is a reproduction of FIG. 5.3.7.1-1: RRC connection re-establishment, successful, from 3GPP TS 38.331 V17.5.0.
Figure 14:
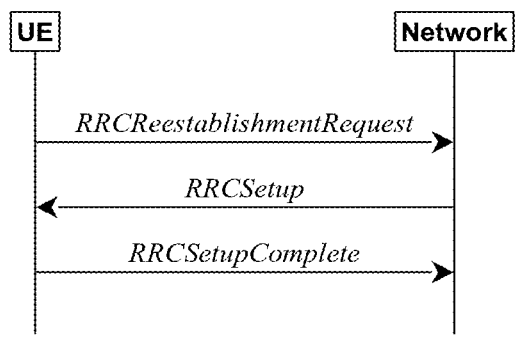
FIG. 14 is a reproduction of FIG. 5.3.7.1-2: RRC re-establishment, fallback to RRC establishment, successful, from 3GPP TS 38.331 V17.5.0.

5.3.7 RRC Connection Re-Establishment
5.3.7.1 General
FIG. 13 is a Reproduction of FIG. 5.3.7.1-1: RRC Connection Re-Establishment, Successful, from 3GPP TS 38.331 V17.5.0.
FIG. 14 is a Reproduction of FIG. 5.3.7.1-2: RRC Re-Establishment, Fallback to RRC Establishment, Successful, from 3GPP TS 38.331 V17.5.0.

The purpose of this procedure is to re-establish the RRC connection. A UE in RRC_CONNECTED, for which AS security has been activated with SRB2 and at least one DRB/multicast MRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.

. . .

5.3.7.2 Initiation

The UE initiates the procedure when one of the following conditions is met:

1>upon detecting radio link failure of the MCG and t316 is not configured, in accordance with 5.3.10; or 1>upon detecting radio link failure of the MCG while SCG transmission is suspended, in accordance with 5.3.10; or 1>upon detecting radio link failure of the MCG while PSCell change or PSCell addition is ongoing, in accordance with 5.3.10; or 1>upon detecting radio link failure of the MCG while the SCG is deactivated, in accordance with 5.3.10; or 1>upon re-configuration with sync failure of the MCG, in accordance with clause 5.3.5.8.3; or 1>upon mobility from NR failure, in accordance with clause 5.4.3.5; or 1>upon integrity check failure indication from lower layers concerning SRB1 or SRB2, except if the integrity check failure is detected on the RRCReestablishment message; or 1>upon an RRC connection reconfiguration failure, in accordance with clause 5.3.5.8.2; or

. . .

Upon initiation of the procedure, the UE shall:

. . .

1>if UE is not configured with attemptCondReconfig:

2>reset MAC;

2>release spCellConfig, if configured;

2>suspend all RBs, and BH RLC channels for IAB-MT, and Uu Relay RLC channels for L2 U2N Relay UE, except SRB0 and broadcast MRBs;

2>release the MCG SCell(s), if configured;

. . .

3>perform cell selection in accordance with the cell selection process as specified in TS 38.304.

. . .

5.3.7.3 Actions Following Cell Selection while T311 is Running

Upon selecting a suitable NR cell, the UE shall:

. . .

2>apply the default MAC Cell Group configuration as specified in 9.2.2;

. . .

2>apply the timeAlignmentTimerCommon included in SIB1;

2>initiate transmission of the RRCReestablishmentRequest message in accordance with 5.3.7.4;

. . .

5.3.7.4 Actions Related to Transmission of RRCReestablishmentRequest Message

The UE shall set the contents of RRCReestablishmentRequest message as follows:

. . .

1>if ta-Report is configured with value enabled and the UE supports TA reporting:

2>indicate TA report initiation to lower layers;

1>submit the RRCReestablishmentRequest message to lower layers for transmission.

Next Quotation 5.3.12 UE Actions Upon PUCCH/SRS Release Request

Upon receiving a PUCCH release request from lower layers, for all bandwidth parts of an indicated serving cell the UE shall:

1>release PUCCH-CSI-Resources configured in CSI-ReportConfig;

1>release SchedulingRequestResourceConfig instances configured in PUCCH-Config.

Upon receiving an SRS release request from lower layers, for all bandwidth parts of an indicated serving cell the UE shall:

1>release SRS-Resource instances configured in SRS-Config.

Upon receiving a positioning SRS configuration for RRC_INACTIVE release request from lower layers, the UE shall:

1>release the configured srs-PosRRC-Inactive.

Next Quotation 5.3.13 RRC Connection Resume 5.3.13.1 General

Figure 15:
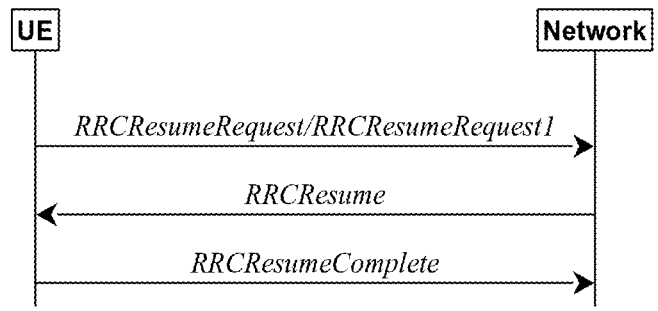
FIG. 15 is a reproduction of FIG. 5.3.13.1-1: RRC connection resume, successful, from 3GPP TS 38.331 V17.5.0.

FIG. 15 is a Reproduction of FIG. 5.3.13.1-1: RRC Connection Resume, Successful, from 3GPP TS 38.331 V17.5.0. FIG. 16 is a Reproduction of FIG. 5.3.13.1-2: RRC Connection Resume Fallback to RRC Connection establishment, successful, from 3GPP TS 38.331 V17.5.0.

The purpose of this procedure is to resume a suspended RRC connection, including resuming SRB(s), DRB(s) and multicast MRB(s) or perform an RNA update. This procedure is also used to initiate SDT in RRC_INACTIVE.

. . .

5.3.13.2 Initiation

The UE initiates the procedure when upper layers or AS (when responding to RAN paging, upon triggering RNA updates while the UE is in RRC_INACTIVE, for NR sidelink communication/discovery/V2X sidelink communication as specified in clause 5.3.13.1a) requests the resume of a suspended RRC connection or requests the resume for initiating SDT as specified in clause 5.3.13.1b.

The UE shall ensure having valid and up to date essential system information as specified in clause 5.2.2.2 before initiating this procedure.

Upon initiation of the procedure, the UE shall:

. . .

2>apply the default MAC Cell Group configuration as specified in 9.2.2;

. . .

2>apply the timeAlignmentTimerCommon included in SIB1;

. . .

1>if ta-Report is configured with value enabled and the UE supports TA reporting:

2>indicate TA report initiation to lower layers;

. . .

1>initiate transmission of the RRCResumeRequest message or RRCResumeRequest1 in accordance with 5.3.13.3.

Quotation End

Some configurations related to NTN and TAR could be provided by NW as specified in TS 38.331 ([4] 3GPP TS 38.331 V17.5.0):

Quotation Start [4]

RRCReconfiguration
  The RRCReconfiguration message is the command to modify an RRC connection. It may convey information for measurement configuration, mobility control, radio resource configuration (including RBs, MAC main configuration and physical channel configuration) and AS security configuration.
  . . .

RRCReconfiguration Message

. . .
RRCReconfiguration-v1530-IEs::=SEQUENCE {masterCellGroup OCTET STRING (CONTAINING CellGroupConfig) OPTIONAL, --Need M
  . . .
  dedicatedSIB1-Delivery OCTET STRING (CONTAINING SIB1) OPTIONAL, --Need N
  dedicatedSystemInformationDelivery OCTET STRING (CONTAINING SystemInformation) OPTIONAL, --Need N
  . . .
}
. . .
RRCReconfiguration-v1610-IEs::=SEQUENCE {
  . . .
  conditionalReconfiguration-r16  ConditionalReconfiguration-r16 OPTIONAL, --Need M
  . . .
}

| RRCReconfiguration-IEs field descriptions |
| --- |
| conditionalReconfiguration
Configuration of candidate target SpCell(s) and execution condition(s) for conditional handover, conditional PSCell addition or conditional PSCell change. The field is absent if any DAPS bearer is configured or if the masterCellGroup includes ReconfigurationWithSync or if the sl-L2RemoteUE-Config or sl-L2RelayUE-Config is configured. For conditional PSCell change, the field is absent if the secondaryCellGroup includes ReconfigurationWithSync. The RRCReconfiguration message contained in DLInformationTransferMRDC cannot contain the field conditionalReconfiguration for conditional PSCell change or for conditional PSCell addition.
dedicatedSIB1-Delivery
This field is used to transfer SIB1 to the UE (including L2 U2N Remote UE). The field has the same values as the corresponding configuration in servingCellConfigCommon.
dedicatedSystemInformationDelivery
This field is used to transfer SIB6, SIB7, SIB8, SIB19, SIB21 to the UE with an active BWP with no common search space configured or the L2 U2N Remote UE in RRC_CONNECTED. For UEs in RRC_CONNECTED (including L2 U2N Remote UE), this field is also used to transfer the SIBs requested on-demand.
masterCellGroup
Configuration of master cell group. |

Next Quotation

RRCResume
  The RRCResume message is used to resume the suspended RRC connection.
  . . .

RRCResume Message

. . .
RRCResume-IEs::=SEQUENCE {
  . . .
  masterCellGroup OCTET STRING (CONTAINING CellGroupConfig) OPTIONAL, --Need M
  . . .
}
. . .

| RRCResume-IEs field descriptions |
| --- |
| masterCellGroup
Configuration of the master cell group. |

Next Quotation

RRCSetup
  The RRCSetup message is used to establish SRB1.
  . . .

RRCSetup Message

. . .
RRCSetup-IEs SEQUENCE {
  . . .
  masterCellGroup OCTET STRING (CONTAINING CellGroupConfig),
  . . .
}
. . .

| RRCSetup-IEs field descriptions |
| --- |
| masterCellGroup
The network configures only the RLC bearer for the SRB1, mac-CellGroupConfig, physicalCellGroupConfig and spCellConfig. |

Next Quotation

SIB19
  SIB19 contains satellite assistance information for NTN access.

SIB19 Information Element

SIB19-r17::=SEQUENCE {
  ntn-Config-r17 NTN-Config-r17 OPTIONAL, --Need R
  t-Service-r17 INTEGER (0 . . . 549755813887) OPTIONAL, --Need R
  referenceLocation-r17 ReferenceLocation-r17 OPTIONAL, --Need R
  distanceThresh-r17 INTEGER(0 . . . 65525) OPTIONAL, --Need R
  ntn-NeighCellConfigList-r17 NTN-NeighCellConfigList-r17

```
OPTIONAL, --Need R
  lateNonCriticalExtension OCTET STRING
OPTIONAL,
    ntn-NeighCellConfigListExt-v1720  NTN-NeighCell-
        ConfigList-r17 OPTIONAL--Need R
}
NTN-NeighCellConfigList-r17::=SEQUENCE (SIZE(1 .
    . . maxCellNTN-r17)) OF NTN-NeighCellConfig-r17
NTN-NeighCellConfig-r17 SEQUENCE {
    ntn-Config-r17 NTN-Config-r17
OPTIONAL, --Need R
    carrierFreq-r17 ARFCN-ValueNR
OPTIONAL, --Need R
    physCellId-r17 PhysCellId OPTIONAL
--Need R
}
```

| SIB19 field descriptions |
|---|
| distance Thresh<br>Distance from the serving cell reference location and is used in location-based measurement initiation in RRC_IDLE and RRC_INACTIVE, as defined in TS 38.304 [20]. Each step represents 50m.<br>ntn-Config<br>Provides parameters needed for the UE to access NR via NTN access such as Ephemeris data, common TA parameters, k_offset, validity duration for UL sync information and epoch.<br>ntn-NeighCellConfigList, ntn-NeighCellConfigListExt<br>Provides a list of NTN neighbour cells including their ntn-Config, carrier frequency and PhysCellId. This set includes all elements of ntn-NeighCellConfigList and all elements of ntn-NeighCellConfigListExt. If ntn-Config is absent for an entry in ntn-NeighCellConfigListExt, the ntn-Config provided in the entry at the same position in ntn-NeighCellConfigList applies. Network provides ntn-Config for the first entry of ntn-NeighCellConfigList. If the ntn-Config is absent for any other entry in ntn-NeighCellConfigList, the ntn-Config provided in the previous entry in ntn-NeighCellConfigList applies.<br>referenceLocation<br>Reference location of the serving cell provided via NTN quasi-Earth fixed system and is used in location-based measurement initiation in RRC_IDLE and RRC_INACTIVE, as defined in TS 38.304.<br>t-Service<br>Indicates the time information on when a cell provided via NTN quasi-Earth fixed system is going to stop serving the area it is currently covering. The field indicates a time in multiples of 10 ms after 00:00:00 on Gregorian calendar date 1 January, 1900 (midnight between Sunday, December 31, 1899 and Monday, January 1, 1900). The exact stop time is between the time indicated by the value of this field minus 1 and the time indicated by the value of this field. |

Next Quotation

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

CellGroupConfig Information Element

```
--Configuration of one Cell-Group:
CellGroupConfig::=SEQUENCE {
    cellGroupId CellGroupId,
    . . .
    mac-CellGroupConfig MAC-CellGroupConfig
OPTIONAL, --Need M
    physicalCellGroupConfig PhysicalCellGroupConfig
OPTIONAL, --Need M
    spCellConfig SpCellConfig
OPTIONAL, --Need M
    . . .
}
--Serving cell specific MAC and PHY parameters for a
    SpCell: SpCellConfig::=SEQUENCE {
    . . .
    reconfigurationWithSync ReconfigurationWithSync
OPTIONAL, --Cond ReconfWithSync
    . . .
}
ReconfigurationWithSync::=SEQUENCE {
    spCellConfigCommon ServingCellConfigCommon
OPTIONAL, --Need M
    . . .
}
. . .
```

| CellGroupConfig field descriptions |
|---|
| mac-CellGroupConfig<br>MAC parameters applicable for the entire cell group.<br>spCellConfig<br>Parameters for the SpCell of this cell group (PCell of MCG or PSCell of SCG). |

| SpCellConfig field descriptions |
|---|
| reconfiguration WithSync<br>Parameters for the synchronous reconfiguration to the target SpCell.<br>servCellIndex<br>Serving cell ID of a PSCell. The PCell of the Master Cell Group uses ID = 0. |

| Conditional Presence | Explanation |
|---|---|
| ReconfWithSync | The field is mandatory present in the RRCReconfiguration message:<br>in each configured CellGroupConfig for which the SpCell changes,<br>in the masterCellGroup:<br>at change of AS security key derived from $K_{gNB}$,<br>in an RRCReconfiguration message contained in a DLInformation TransferMRDC message,<br>path switch of L2 U2N remote UE to the target PCell,<br>path switch of L2 U2N remote UE to the target L2 U2N Relay UE,<br>in the secondaryCellGroup at:<br>PSCell addition,<br>SCG resume with NR-DC or (NG)EN-DC,<br>update of required SI for PSCell,<br>change of AS security key derived from S-$K_{gNB}$ in NR-DC while the UE is configured with at least one radio bearer with keyToUse set to |

-continued

| Conditional Presence | Explanation |
|---|---|
| | secondary and that is not released by this RRCReconfiguration message, MN handover in (NG)EN-DC. Otherwise, it is optionally present, need M. The field is absent in the masterCellGroup in RRCResume and RRCSetup messages and is absent in the masterCellGroup in RRCReconfiguration messages if source configuration is not released during DAPS handover. |

Next Quotation

MAC-CellGroupConfig
 The IE MAC-CellGroupConfig is used to configure MAC parameters for a cell group, including DRX.

MAC-CellGroupConfig Information Element

MAC-CellGroupConfig::=SEQUENCE {
 . . .
 tag-Config TAG-Config
OPTIONAL, --Need M
 . . .
 tar-Config-r17 SetupRelease {TAR-Config-r17}
OPTIONAL, --Need M
 . . .
}
. . .

| MAC-CellGroupConfig field descriptions |
|---|
| tag-Config The field is used to configure parameters for a time-alignment group. The field is not present if any DAPS bearer is configured. |

Next Quotation

NTN-Config
 The IE NTN-Config provides parameters needed for the UE to access NR via NTN access.

NTN-Config Information Element

NTN-Config-r17::=SEQUENCE {
 epochTime-r17 EpochTime-r17
 OPTIONAL, --Need R
 ntn-UISyncValidityDuration-r17 ENUMERATED{s5, s10, s15, s20, s25, s30, s35, s40, s45, s50, s55, s60, s120, s180, s240, s900}
 OPTIONAL, --Cond SIB19
 cellSpecificKoffset-r17 INTEGER(1 . . . 1023)
 OPTIONAL, --Need R
 kmac-r17 INTEGER(1 . . . 512)
 OPTIONAL, --Need R
 ta-Info-r17 TA-Info-r17
 OPTIONAL, --Need R
 ntn-PolarizationDL-r17 ENUMERATED {rhcp, lhcp, linear}
 OPTIONAL, --Need R
 ntn-PolarizationUL-r17 ENUMERATED {rhcp, lhcp, linear}
 OPTIONAL, --Need R
 ephemerisInfo-r17 EphemerisInfo-r17
 OPTIONAL, --Need R
 ta-Report-r17 ENUMERATED {enabled}
 OPTIONAL, --Need R
 . . .
}
EpochTime-r17::=SEQUENCE {
 sfn-r17 INTEGER(0 . . . 1023),
 subFrameNR-r17 INTEGER(0 . . . 9)
}
TA-Info-r17::=SEQUENCE {
 ta-Common-r17 INTEGER(0 . . . 66485757),
 ta-CommonDrift-r17 INTEGER(-257303 . . . 257303)
 OPTIONAL, --Need R
 ta-CommonDriftVariant-r17 INTEGER(0 . . . 28949)
 OPTIONAL--Need R
}

| NTN-Config field descriptions |
|---|
| Ephemerisinfo This field provides satellite ephemeris either in format of position and velocity state vector or in format of orbital parameters. This field is excluded when determining changes in system information, i.e. changes to ephemerisInfo should neither result in system information change notifications nor in a modification of value Tag in SIB1. |
| epoch Time Indicate the epoch time for the NTN assistance information. When explicitly provided through SIB, or through dedicated signaling, the EpochTime is the starting time of a DL sub-frame, indicated by a SFN and a sub-frame number signaled together with the assistance information. For serving cell, the field sfn indicates the current SFN or the next upcoming SFN after the frame where the message indicating the epochTime is received. For neighbour cell, the sfn indicates the SFN nearest to the frame where the message indicating the epoch Time is received. The reference point for epoch time of the serving or neighbour NTN payload ephemeris and Common TA parameters is the uplink time synchronization reference point. If this field is absent, the epoch time is the end of SI window where this SIB19 is scheduled. This field is mandatory present when ntn-Config is provided in dedicated configuration. If this field is absent in ntn-Config provided via NTN-NeighCellConfig the UE uses epoch time of the serving cell, otherwise the field is based on the timing of the serving cell, i.e. the SFN and sub-frame number indicated in this field refers to the SFN and sub-frame of the serving cell. In case of handover or conditional handover, this field is based on the timing of the target cell, i.e. the SFN and sub-frame number indicated in this field refers to the SFN and sub-frame of the target cell. For the target cell the UE considers epoch time, indicated by the SFN and sub-frame number in this field, to be the frame nearest to the frame in which the message indicating the epoch time is received. This field is excluded when determining changes in system information, i.e. changes to epochTime should neither result in system information change notifications nor in a modification of value Tag in SIB1. |

| NTN-Config field descriptions |
| --- |
| cellSpecificKoffset<br>Scheduling offset used for the timing relationships that are modified for NTN (see TS 38.213). The unit of the field K_offset is number of slots for a given subcarrier spacing of 15 kHz. If the field is absent UE assumes value 0.<br>kmac<br>Scheduling offset provided by network if downlink and uplink frame timing are not aligned at gNB. If the field is absent UE assumes value 0. In FR1, the unit of kmac is number of slots for a given subcarrier spacing of 15 kHz.<br>ntn-PolarizationDL<br>If present, this parameter indicates polarization information for downlink transmission on service link: including Right hand, Left hand circular polarizations (RHCP, LHCP) and Linear polarization.<br>ntn-PolarizationUL<br>If present, this parameter indicates Polarization information for uplink service link.<br>If not present and ntn-PolarizationDL is present, UE assumes the same polarization for UL and DL.<br>ntn-UISyncValidityDuration<br>A validity duration configured by the network for assistance information (i.e. Serving and/or neighbour satellite ephemeris and Common TA parameters) which indicates the maximum time duration (from epoch Time) during which the UE can apply assistance information without having acquired new assistance information.<br>The unit of ntn-UISync ValidityDuration is second. Value s5 corresponds to 5 s, value s10 indicate 10 s and so on. This parameter applies to both connected and idle mode UEs. If this field is absent in ntn-Config provided via NTN-NeighCellConfig, the UE uses validity duration from the serving cell assistance information. This field is excluded when determining changes in system information, i.e. changes of ntn-UISyncValidityDuration should neither result in system information change notifications nor in a modification of value Tag in SIB1. ntn-UISyncValidityDuration is only updated when at least one of epochTime, ta-Info, ephemerisInfo is updated.<br>ta-Common<br>Network-controlled common timing advanced value and it may include any timing offset considered necessary by the network. ta-Common with value of 0 is supported. The granularity of ta-Common is $4.072 \times 10^{(-3)}$ μs. Values are given in unit of corresponding granularity. This field is excluded when determining changes in system information, i.e. changes of ta-Common should neither result in system information change notifications nor in a modification of value Tag in SIB1.<br>ta-CommonDrift<br>Indicate drift rate of the common TA. The granularity of ta-CommonDrift is $0.2 \times 10^{(-3)}$ μs/s. Values are given in unit of corresponding granularity. This field is excluded when determining changes in system information, i.e. changes of ta-CommonDrift should neither result in system information change notifications nor in a modification of valueTag in SIB1.<br>ta-CommonDriftVariant<br>Indicate drift rate variation of the common TA. The granularity of ta-CommonDriftVariant is $0.2 \times 10^{(-4)}$ μs/s^2. Values are given in unit of corresponding granularity. This field is excluded when determining changes in system information, i.e. changes of ta-CommonDriftVariant should neither result in system information change notifications nor in a modification of value Tag in SIB1.<br>ta-Report<br>When this field is included in SIB19, it indicates reporting of timing advanced is enabled during Random Access due to RRC connection establishment or RRC connection resume, and during RRC connection reestablishment. When this field is included in ServingCellConfigCommon within dedicated signalling, it indicates TA reporting is enabled during Random Access due to reconfiguration with sync (see TS 38.321 [3], clause 5.4.8). |

| Conditional Presence | Explanation |
| --- | --- |
| SIB19 | The field is mandatory present for the serving cell in SIB19. The field is optionally present, Need R, otherwise. |

Next Quotation

ServingCellConfigCommon

The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

ServingCellConfigCommon Information Element

```
ServingCellConfigCommon::=SEQUENCE {
    physCellId PhysCellId
OPTIONAL, --Cond HOAndServCellAdd,
    . . .
    ntn-Config-r17 NTN-Config-r17
OPTIONAL--Need R
    . . .
}
```

Next Quotation

TAR-Config

The IE TAR-Config is used to configure Timing Advance reporting in non-terrestrial networks.

TAR-Config Information Element

```
TAR-Config-r17::=SEQUENCE {
    offsetThresholdTA-r17  ENUMERATED  {ms0dot5,
        ms1, ms2, ms3, ms4, ms5, ms6, ms7, ms8, ms9,
        ms10, ms11, ms12,
    ms13, ms14, ms15, spare13, spare12, spare11, spare10,
        spare9, spare8, spare7,
    spare6, spare5, spare4, spare3, spare2, spare1}
OPTIONAL, --Need R
    timingAdvanceSR-r17 ENUMERATED {enabled}
```

OPTIONAL, --Need R

...

}

---

TAR-Config field descriptions offsetThresholdTA
Offset for TA reporting as specified in TS 38.321 [3].
Network only configures this parameter for MCG.
timing AdvanceSR
Used to configure whether a Timing Advance report
may trigger a Scheduling Request as specified in TS 38.321 [3].

---

Quotation End

The validity timer (or UL synchronization timer) (e.g. T430) handling is specified in TS 38.331 ([4]3GPP TS 38.331 V17.5.0 and [9] 3GPP TS 38.331 V17.6.0) and TS 38.321 ([3] 3GPP TS 38.321 V17.5.0) as below:

Quotation Start [4]

5.2.2.4.21 Actions Upon Reception of SIB19
Upon receiving SIB19, the UE in RRC_CONNECTED shall:
1>start or restart T430 for serving cell with the timer value set to ntn-UlSyneValidityDuration for the serving cell from the subframe indicated by epochTime for the serving cell;
NOTE: UE should attempt to re-acquire SIB19 before the end of the duration indicated by ntn-UlSyneValidity-Duration and epochTime by UE implementation.

Next Quotation 5.2.2.6 T430 Expiry
The UE shall:
1>if T430 for serving cell expires and if in RRC_CONNECTED:
  2>inform lower layers that UL synchronisation is lost;
  2>acquire SIB19 as defined in clause 5.2.2.3.2;
  2>upon successful acquisition of SIB19:
    3>inform lower layers when UL synchronisation is obtained;
NOTE: The exact time when UL synchronisation is obtained (after SIB19 is acquired) is left to UE implementation, which can be from the subframe indicated by epochTime and optionally before the subframe indicated by epochTime.

Quotation End

Quotation Start [9]

5.3.5.5 Cell Group Configuration
5.3.5.5.1 General

...

The UE performs the following actions based on a received CellGroupConfig IE:
1>if the CellGroupConfig contains the spCellConfig with reconfigurationWithSync:
  2>perform Reconfiguration with sync according to 5.3.5.5.2;

...

5.3.5.5.2 Reconfiguration with Sync
The UE shall perform the following actions to execute a reconfiguration with sync.
1>if the AS security is not activated, perform the actions upon going to RRC_IDLE as specified in 5.3.11 with the release cause 'other' upon which the procedure ends;
1>stop timer T430 if running;

...

2>if this procedure is executed for the MCG or if this procedure is executed for an SCG not indicated as deactivated in the E-UTRA or NR RRC message in which the RRCReconfiguration message is embedded:
  3>start timer T304 for the corresponding SpCell with the timer value set to t304, as included in the reconfigurationWithSync;

...

2>start synchronising to the DL of the target SpCell;
2>apply the specified BCCH configuration defined in 9.1.1.1 for the target SpCell;
2>acquire the MIB of the target SpCell, which is scheduled as specified in TS 38.213;
2>if NTN-Config is configured for the target cell:
  3>start timer T430 with the timer value set to ntn-UlSyncValidityDuration from the subframe indicated by epochTime, according to the target cell NTN-Config;

...

3>reset the MAC entity of this cell group;
  3>consider the SCell(s) of this cell group, if configured, that are not included in the SCellToAddModList in the RRCReconfiguration message, to be in deactivated state;
  3>apply the value of the newUE-Identity as the C-RNTI for this cell group;
  3>configure lower layers in accordance with the received spCellConfigCommon;
  3>configure lower layers in accordance with any additional fields, not covered in the previous, if included in the received reconfigurationWithSync.

Next Quotation 5.3.5.13 Conditional Reconfiguration
5.3.5.13.1 General
The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the ConditionalReconfiguration IE.

5.3.5.13.4 Conditional Reconfiguration Evaluation
The UE shall:
1>for each condReconfigId within the VarConditionalReconfig:
  2>if the RRCReconfiguration within condRRCReconfig includes the masterCellGroup including the reconfigurationWithSync:
    3>consider the cell which has a physical cell identity matching the value indicated in the ServingCellConfigCommon included in the reconfigurationWithSync within the masterCellGroup in the received condRRCReconfig to be applicable cell;

...

2>for each measId included in the measIdList within VarMeasConfig indicated in the condExecutionCond or condExecutionCondSCG associated to condReconfigId:
   3>if the condEventId is associated with condEventT1, and if the entry condition applicable for this event associated with the condReconfigId, i.e. the event corresponding with the condEventId(s) of the corresponding condTriggerConfig within VarConditionalReconfig, is fulfilled for the applicable cell; or
   3>if the condEventId is associated with condEventD1, and if the entry conditions applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or
   3>if the condEventId is associated with condEventA3, condEventA4 or condEventA5, and if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4>consider the event associated to that measId to be fulfilled;
   3>if the measId for this event associated with the condReconfigId has been modified; or
   3>if the condEventId is associated with condEventT1, and if the leaving condition applicable for this event associated with the condReconfigId, i.e. the event corresponding with the condEventId(s) of the corresponding condTriggerConfig within VarConditionalReconfig, is fulfilled for the applicable cell; or
   3>if the condEventId is associated with condEventD1, and if the leaving condition(s) applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or
   3>if the condEventId is associated with condEventA3, condEventA4 or condEventA5, and if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4>consider the event associated to that measId to be not fulfilled;
2>if event(s) associated to all measId(s) within condTriggerConfig for the applicable cell are fulfilled:
   3>consider the applicable cell, associated to that condReconfigId, as a triggered cell;
   3>initiate the conditional reconfiguration execution, as specified in 5.3.5.13.5;
. . .

5.3.5.13.5 Conditional Reconfiguration Execution
The UE shall:
. . .
1>for the selected cell of conditional reconfiguration execution:
   2>apply the stored condRRCReconfig of the selected cell and perform the actions as specified in 5.3.5.3;

Quotation End

Quotation Start [3]

5.2a Maintenance of UL Synchronization
The MAC entity shall for each Serving Cell:
1>if an indication of uplink synchronization has been received from upper layers (see clause 5.2.2.6 of TS 38.331 [4]):
   2>allow uplink transmission on the Serving Cell.
1>if an indication of uplink synchronization loss is received from upper layers (see clause 5.2.2.6 of TS 38.331 [4]):
   2>flush all HARQ buffers;
   2>not perform any uplink transmission on the Serving Cell.
NOTE: The MAC entity suspends all UL operations (e.g. stop RACH, SR, and UL HARQ operation) after receiving the indication of an uplink synchronization loss and resumes the operation when receiving an indication of uplink synchronization.

Quotation End

Moreover, the following agreements were made for unchanged PCI mechanism (and/or satellite switch with resync) in RAN2 meetings.
In RAN2 #121bis meeting:
In quasi-earth fixed cell case, for hard satellite switch in the same SSB frequency and same gNB (no key change), satellite switching without PCI changing (not requiring L3 mobility) is supported, unless major technical issues are identified by RAN1 (as usual RAN2 will aim at minimizing the specification impact so that it fits in Rel-18).
In RAN2 #122 meeting:
In hard switch unchanged PCI scenario (i.e. no handover), the UE needs to know the time the UE attempts to re-synchronize. (FFS whether a new "t-Start"/a t-gap is needed or whether t-Service can be reused (i.e. no other IE) if the gap is very short/zero).
In RAN2 #123 meeting:
An explicit indication will be introduced to enable the unchanged PCI switch;
The unchanged PCI mechanism can be applied to the case where the coverage gap is zero or negligible (where there is no need to introduce t-gap or t-start). FFS whether we need to support scenarios that require the introduction of t-gap or t-start;
PCI unchanged procedure can be performed without performing RACH;
In the unchanged PCI case, the UE considers UL synchronization timer expired at t-Service (current cell stop time) to stop any UL operation. FFS on timeAlignmentTimer handling;

In the unchanged PCI case, for RACH-based solution, the UE may trigger RACH immediately after DL synchronizing with the new satellite.

In RAN2 #123bis meeting:

We don't consider the impact on Rel-17 UEs behavior (or Rel-18 UEs not supporting unchanged PCI) when defining the Rel-18 unchanged PCI solution.

Network provides the sync information of target satellite in advance to UE before satellite switching, via broadcast signalling.

RAN2 confirms satellite switching with unchanged PCI is only applicable on quasi-earth fixed system.

Only 1 target satellite information (i.e. NTN-config) of serving cell is provided in SIB19. FFS on exact signalling.

SMTC configuration of target satellite needs further discussion:

FFS on whether and how to provide the SMTC configuration of target satellite.

FFS on how to handle the SMTC adjustment.

We support soft satellite switching in Rel-18.

There will be an indication (FFS if explicit or implicit) whether hard switch or soft switch is used.

At least soft satellite switching, network provides SSB information of target satellite to UE. FFS on the details: options include e.g. indicating a time offset/information or indicating a different SSB index for the target satellite (FFS for Hard satellite switch)

In soft satellite switching, UE can start synchronizing with target satellite before T-service of source satellite.

We introduce a T-start which indicates the earliest occasion when the UE can start synchronizing with target satellite (actual signalling is FFS). In soft switch scenario, T-start of target satellite is earlier than T-service of source satellite (FFS if T-start is also used for hard satellite switch).

For soft satellite switching, the exact time when the UE starts synchronizing with target satellite (between T-start and T-service) is up to UE implementation.

UE is not required to connect to source satellite when the UE switches to target satellite.

The related text for satellite switch in running CR for NTN Rel-18 ([5] R2-230934) on top of NR RRC specification TS 38.331 ([4] 3GPP TS 38.331 V17.5.0) is quoted as below:

Quotation Start [5]

SIB19 Information Element

SIB19-r17::=SEQUENCE {
 ntn-Config-r17 NTN-Config-r17
OPTIONAL, --Need R
 t-Service-r17 INTEGER (0 . . . 549755813887)
OPTIONAL, --Need R
 referenceLocation-r17 ReferenceLocation-r17
OPTIONAL, --Need R
 distanceThresh-r17 INTEGER(0 . . . 65525)
OPTIONAL, --Need R
 ntn-NeighCellConfigList-r17 NTN-NeighCellConfigList-r17
OPTIONAL, --Need R
 lateNonCriticalExtension OCTET STRING
OPTIONAL,
 . . . ,
 [[
 ntn-NeighCellConfigListExt-v1720 NTN-NeighCellConfigList-r17 OPTIONAL--Need R
 ]],
 [[
 movingReferenceLocation-r18 ENUMERATED {FFS}OPTIONAL, --Need R
 satSwitchWithReSync-r18 ENUMERATED {FFS} OPTIONAL--Need R
 ]]
}
. . .

| SIB19 field descriptions |
| --- |
| satSwitch WithReSync |
| FFS |
| movingReferenceLocation |
| Reference location of the serving cell of an NTN Earth moving system at a time reference. It is used in location-based measurement initiation in RRC_IDLE and RRC_INACTIVE, as defined in TS 38.304 [20]. The time reference of thisfield is indicated by epochTime in ntn-Config of the serving cell. This field is excluded when determining changes in system information, i.e. changes to movingReferenceLocation should neither result in system information change notifications nor in a modification of valueTag in SIB1. |
| t-Service |
| Indicates the time information on when a cell provided via NTN is going to stop serving the area it is currently covering. This field applies for service link switches in NTN quasi-Earth fixed system and feeder link switches for both NTNquasi-Earth fixed and Earth moving system. The field indicates a time in multiples of 10 ms after 00:00:00 on Gregorian calendar date 1 January, 1900 (midnight between Sunday, December 31, 1899 and Monday, January 1, 1900). The exact stop time is between the time indicated by the value of this field minus 1 and the time indicated by the value of this field. |

Quotation End

A Non-Terrestrial Network (NTN) is defined as a Next Generation Radio Access Network (NG-RAN) consisting of Next Generation Node Bs (gNBs), which provide non-terrestrial New Radio (NR) access to User Equipment (UE) by means of an NTN payload embarked on an airborne or space-borne NTN vehicle and an NTN Gateway. The UE may link to, camp on, and/or connect to the NTN network that involves airborne/spaceborne for transmission. The NTN may comprise various platforms, including a Low Earth Orbit (LEO) satellite, a Medium Earth Orbit (MEO) satellite, a Highly Elliptical Orbit (HEO) satellite, a Geostationary Earth Orbit (GEO) satellite, a Geostationary Synchronous Orbit (GSO) satellite, a Non-Geostationary Synchronous Orbit (NGSO) satellite, and/or a High Altitude Platform Station (HAPS). A LEO satellite could have an earth-fixed beam (e.g., the beam is temporarily fixed on a location during a time period) or an earth-moving beam (e.g., the beam is continuously moving along with the satellite). The NTN could offer a wide-area coverage and provide Network (NW) access in the scenario when a Terrestrial Network (TN) is unfeasible (e.g., desert, polar area, and/or on an airplane).

The NW could provide NTN information to the UE. The NTN information may be the parameters needed for the UE to access a NW via NTN access. The NTN information may be or comprise at least one or more NTN configurations (e.g., NTN-Config), a time information (e.g., t-Service), a reference location (e.g., referenceLocation) and a distance threshold (e.g., distance Thresh). The NTN information and/or NTN configuration (e.g., NTN-Config) may be or comprise satellite assistance information. The NW could provide the NTN information to the UE in an NTN-specific system information (e.g., SIB19) or a Radio Resource Control (RRC) message (e.g., RRCReconfiguration), e.g., via a serving cell. The NTN-specific system information may be a System Information Block (SIB) comprising NTN information. The NTN configuration (e.g., NTN-Config) may be or comprise (at least) epoch time (e.g., epochTime), validity duration (e.g., ntn-UISyncValidityDuration), satellite ephemeris (e.g., ephemerisInfo), and/or common Timing Advance (TA) (e.g., ta-Info). The validity duration (e.g., ntn-UISyncValidityDuration) may indicate the maximum time during which the UE can apply the satellite information and/or NTN-specific system information (e.g., SIB19) without having acquired a new one. The validity duration (e.g., ntn-UISyncValidityDuration) and/or epoch time (e.g., epochTime) may be associated with (or applied to) the NTN-specific system information (e.g., SIB19), NTN configuration (e.g., NTN-Config), satellite information, satellite ephemeris (e.g., ephemerisInfo), and/or common TA (e.g., ta-Info). The time information (e.g., t-Service) may be the stop serving time of the serving cell. The time information (e.g., t-Service) may be a timing when the UE would leave the coverage of the serving cell. The time information (e.g., t-Service) may indicate the time information on when the serving cell is going to stop serving the area it is currently covering.

Throughout the present disclosure, the SIB19 may be a system information for the serving cell. The SIB19 may be an NTN-specific system information. The SIB19 may contain satellite assistance information. The SIB19 may contain Uplink (UL) synchronization information for NTN. The system information may be referred to as a system information block. Throughout the present disclosure, one, some, and/or all instances of "NTN configuration" may correspond to, may be supplemented with, and/or may be replaced by "NTN information", "satellite information", "NTN-Config" and/or "assistance information".

The UE should maintain UL time alignment for the serving cell(s). The UE would maintain a TA value for UL/Downlink (DL) transmission. The (full) TA value is $T_{TA}$ as specified in TS 38.211 ([2] 3GPP TS 38.211 V17.5.0). The $T_{TA}$ is composed of $N_{TA}$, $N_{TA,offset}$, $N_{TA,adj}^{common}$ and/or $N_{TA,adj}^{UE}$ based on a NW configuration. The $N_{TA,offset}$ is configured by a NW, e.g., via n-TimingAdvanceOffset or a default value. The $N_{TA}$ is indicated or adjusted by a TA command. In TN, the UE calculates $T_{TA}$ with $N_{TA}$ and $N_{TA,offset}$, and the $N_{TA,adj}^{common}$ and $N_{TA,adj}^{US}$ may not be used. The UE would receive $N_{TA}$ via a Random Access (RA) response (e.g., Random Access Response (RAR), MSGB) during an RA procedure. The UE would receive $N_{TA}$ from Timing Advance Command Medium Access Control (MAC) Control Element (CE) in RRC connected mode. For a Random Access Channel (RACH)-less handover, the UE may be indicated $N_{TA}$ as zero or identical to Primary Timing Advance Group (PTAG) via RRC reconfiguration message (e.g., RRCConnectionReconfiguration). A set of serving cells having the same TA would be grouped in a Timing Advance Group (TAG). The TAG comprising the Special Cell (SpCell) is a PTAG. The TAG not comprising the SpCell is a Secondary TAG (STAG). The UE may have a PTAG and at most three STAGs in each cell group. The SpCell is used as timing reference for the PTAG. An activated Secondary Cell (SCell) of a STAG is used as timing reference for the STAG. And the UE maintains a TA timer (e.g., timeAlignmentTimer) for each TAG.

In NTN, the UE would pre-compensate a TA value based on satellite assistance information (e.g., the parameter in NTN-Config) and/or the UE's location. In addition to $N_{TA}$ and $N_{TA,offset}$, the UE calculates/derives $N_{TA,adj}^{common}$ and $N_{TA,adj}^{US}$ for $T_{TA}$. The $N_{TA,adj}^{common}$ is derived from common TA information for the satellite. And the $N_{TA,adj}^{UE}$ is pre-compensated by the UE using UE location and satellite location based on ephemeris information. The $N_{TA,adj}^{common}$ is a common TA value and/or a satellite specific TA value. The $N_{TA,adj}^{UE}$ is a UE specific TA value. The UE would receive an NTN configuration and a pre-compensate TA value (e.g., $T_{TA}$) in NTN. The UE may calculate UE-gNB Round Trip Time (RTT) as the sum of the TA value (e.g., $T_{TA}$) and kmac (scheduling offset). The UE would delay the start of RA timers and/or Discontinuous Reception (DRX) timers by the UE-gNB RTT.

Moreover, the UE would report the full TA value (e.g., $T_{TA}$) and/or UE location to the NW in NTN. The NW may need to know the TA value of the UE due to UE pre-compensating the TA value. The UE would trigger a TA Report (TAR) based on configuration of ta-Report and/or offsetThresholdTA. The UE would trigger a TAR in response to connecting a serving cell, if enabled by an indication (e.g., ta-Report). The UE would trigger a TAR in response to receiving and/or being configured with a TA threshold (e.g., offsetThresholdTA). The UE would trigger a TAR in response to a condition related to the TA threshold (e.g., offsetThresholdTA) is fulfilled. The TAR would be transmitted via a Timing Advance Report MAC CE. More detail for TAR could be found in TS 38.321 ([3] 3GPP TS 38.321 V17.5.0) and TS 38.331 ([4] 3GPP TS 38.331 V17.5.0).

In NTN, the NW on the ground that serves a UE may be unchanged while the satellite in between the UE and the NW on the ground may change, due to satellite switching or satellite moving. To prevent L3 mobility such as a handover caused by the satellite switch, in order to reduce the signaling overhead and/or interruption time, an unchanged Physical Cell Identity (PCI) mechanism would be supported in NTN. The unchanged PCI mechanism may be or be referred to as satellite switch, satellite switching without PCI changing, satellite switch with resynchronization, and/or an unchanged PCI switch. The unchanged PCI mechanism may be or be referred to as a mechanism without L3 mobility, e.g., handover. The satellite switch mechanism avoids L3 mobility for UEs in the cell by maintaining the same PCI on the geographical area. The UE could keep the cell configuration when the satellite switches without changing gNB. The signaling such as Handover (HO) command could be reduced. The UE should not trigger an RRC reconfiguration procedure. The UE may perform re-synchronization to the serving cell since the satellite ephemeris (e.g., ephemerisInfo) and/or common TA (e.g., ta-Info) may be different. The UE may perform DL and/or UL synchronization. The UE may (re)acquire the NTN-specific system information. In the unchanged PCI mechanism, the UE may switch/change the serving satellite without performing handover, without receiving RRC (re)configuration, without changing the PCI of serving cell, and/or without changing serving gNB.

Figure 17:
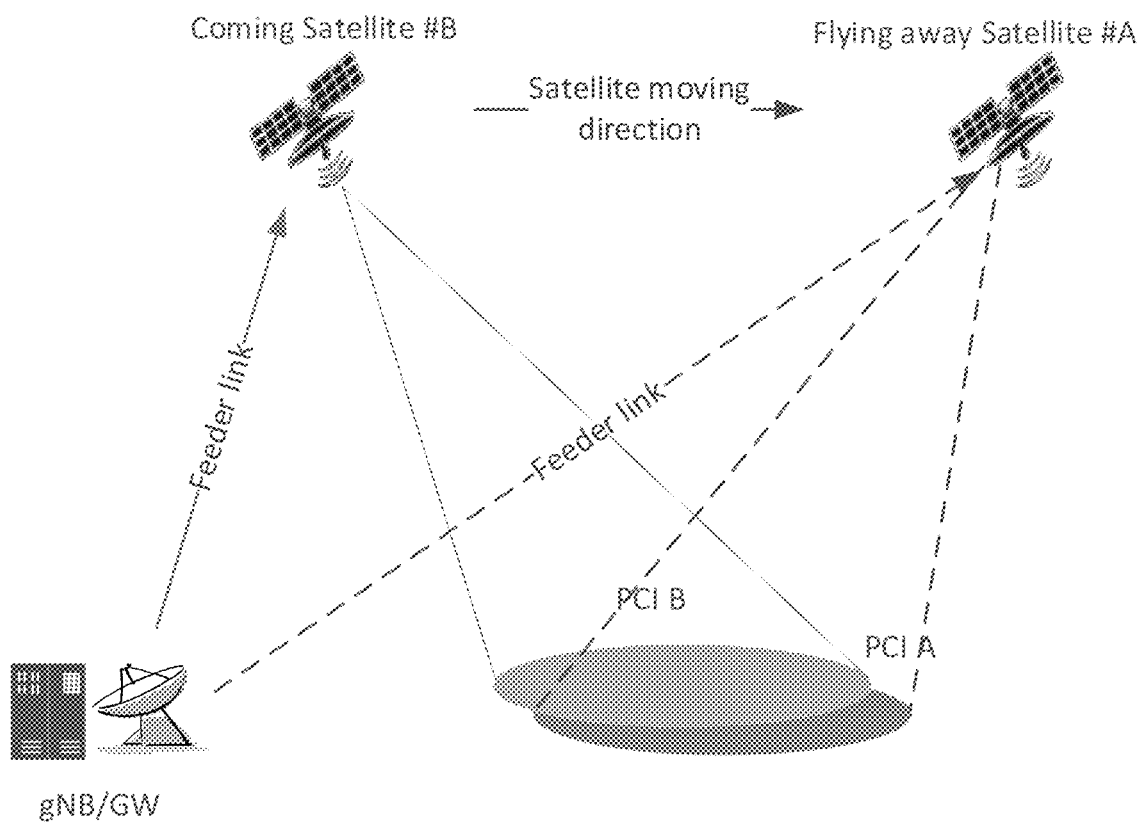
FIG. 17 is an example diagram of satellite switch, in accordance with embodiments of the present invention.

Throughout the present disclosure, the unchanged PCI switch may be (replaced by/equivalent to) a procedure of unchanged PCI switch, cell switch with resynchronization, satSwitchWithResync, cell switch with unchanged PCI, satellite switch, hard satellite switch, satellite switch without PCI change, PCI unchanged procedure, a procedure of cell switch, a procedure of re-synchronization, or the like, and/or a combination of the above. Throughout the present disclosure, the "satellite switch" may be, be referred to, be replaced by and/or be equivalent to a "satellite switch with resynchronization" and/or a "satellite switching". An example of an unchanged PCI and/or satellite switch is shown in FIG. 17 (quoted from [6] R2-2308373). A PCI A and a PCI B in FIG. 17 are the same PCI.

The UE may be indicated (by a network) to perform (or initiate) an unchanged PCI switch and/or satellite switch. The UE may receive a configuration (or indication) of unchanged PCI switch and/or satellite switch. The configuration (or indication) of unchanged PCI switch and/or satellite switch may indicate the UE to perform (or initiate) an unchanged PCI switch and/or satellite switch (e.g., at a specific timing such as t-Service). The configuration may be included in a system information (e.g., SIB19). The configuration (or indication) may be satSwitchWithResync. The configuration (or indication) may be included in satSwitchWithResync. The UE may receive at least a time information (e.g., t-service) for the unchanged PCI switch and/or satellite switch, and/or a satellite information (e.g., NTN-Config) for a target satellite in the system information (e.g., SIB19). Throughout the present disclosure, the satSwitchWithResync may be an indication of (enabling/triggering) unchanged PCI switch and/or satellite switch. The UE may receive the indication of (enabling/triggering) unchanged PCI switch and/or satellite switch.

The UE may perform (or initiate) the unchanged PCI switch and/or satellite switch, e.g., in response to (receiving) the indication (or configuration). The UE may perform (or initiate) the unchanged PCI switch and/or satellite switch, e.g., at a specific time, at t-Service. The specific time (or t-Service) may be indicated by the network. The specific time (or t-Service) may be indicated in system information (e.g., SIB19). The specific time (or t-Service) may be (or indicate) a cell stop time. The specific time (or t-Service) may be (or indicate) when a cell provided via NTN is going to stop serving the area it is currently covering.

In response to the unchanged PCI switch and/or satellite switch (e.g., if receiving the indication of satellite switch, during the satellite switch (procedure), upon initiation of the satellite switch (procedure), when the satellite switch (procedure) is initiated, and/or at a cell stop time such as t-Service), the UE may:

Consider a UL synchronization timer (e.g., T430, for NTN) expired;
(NOTE: the UL synchronization timer may be different from timeAlignmentTimer.)
Not use UE specific Koffset, if configured, e.g., after a cell stop time (e.g., t-Service), and/or until receiving a new differential Koffset (e.g., MAC CE);
Use cell specific Koffset, e.g., after a cell stop time (e.g., t-Service), and/or until receiving a new differential Koffset (e.g., MAC CE);
Perform DL (re)synchronization with the serving cell (or NW);
(Re)acquire SIB19 (and/or SIB1, SIB2);
(Re)acquire NTN related configuration (e.g., ephemeris) (e.g., of the serving cell, included in SIB19);
May or may not trigger an RA procedure; and/or
May or may not perform UL synchronization with the serving cell (or NW).
(NOTE: the RA procedure may be 2-step RA or 4-step RA.)

The satellite switch may be RACH-based. The UE may trigger an RA procedure for the satellite switch. The UE may receive a configuration (or indication) indicating that the satellite switch is RACH-based.

The UE may receive a configuration (or indication) indicating the UE to perform (or initiate) a RACH-based satellite switch. If the configuration (or indication) indicating the UE to perform (or initiate) a RACH-based satellite switch, the UE triggers an RA procedure for the satellite switch.

The satellite switch may be RACH-less. The UE may not trigger an RA procedure for the satellite switch. The UE may receive a configuration (or indication) indicating that the satellite switch is RACH-less. The UE may receive a configuration (or indication) indicating the UE to perform (or initiate) a RACH-less satellite switch. If the configuration (or indication) indicating the UE to perform (or initiate) a RACH-less satellite switch, the UE does not trigger an RA procedure for the satellite switch.

For example, the UE may receive a first indication (e.g., satSwitchWithReSync) of (enabling) an unchanged PCI mechanism and/or of a satellite switch, e.g., via a first SIB19. The UE may (start to) perform DL synchronization (e.g., to the new satellite, to the serving cell) at, before, or upon a time information (e.g., t-service). The UE may (start to) perform DL synchronization before or upon the timing indicated by the time information (e.g., t-service). The UE may consider a UL synchronization timer (e.g., T430) expires at the time information (e.g., t-service). The UE may receive a second SIB19 after DL synchronization. The second SIB19 comprise the satellite information after switching the serving satellite. The UE may start the UL synchronization timer (e.g., T430) in response to receiving the second SIB19. The UE may perform RACH or not perform RACH in the unchanged PCI mechanism or procedure (or satellite switch procedure). The UE may perform RACH or not perform RACH after DL synchronization. The unchanged PCI mechanism and/or satellite switch may be RACH-based or RACH-less. The SIB19 may be an NTN-specific system information.

The UE would pre-compensate TA value based on the satellite assistance information (e.g., the parameter in NTN-Config) in the second SIB19. However, based on the current mechanism, the UE could not report the full TA value to the network after performing an unchanged PCI switch. The network could not know the TA of the UE and/or provide a UE specific K offset for the UE. How the UE trigger or report its TA value should be defined in the case of the unchanged PCI switch.

To solve the issue, the UE could trigger a TA report (e.g., for satellite switch) based on an NW configuration. The UE may trigger a TA report in response to (at least) receiving the NW configuration. The triggering of a TA report may comprise triggering a TA report, indicating lower/upper layers of (triggering) the TA report, calculating (full) TA value, generating a TAR MAC CE for the TA report, triggering a Scheduling Request (SR) for the TA report, and/or transmitting the TA report.

The NW configuration may be an indication of a TA report (e.g., ta-Report). The NW configuration may indicate whether a TA report is triggered (e.g., for satellite switch). The NW configuration may be an indication (e.g., the first indication) of a satellite switch (e.g., satSwitchWithReSync). The NW configuration may indicate whether the UE should initiate a satellite switch, e.g., at a specific time (e.g., t-Service). The NW configuration may be an indication of RACH type (e.g., RACH-based, RACH-less), e.g., for the satellite switch. The NW configuration may indicate whether an RA procedure is triggered (or initiated) for the satellite switch. The NW configuration may be a new indication related to the satellite switch. The NW configuration may be a new indication comprised/configured in the indication (e.g., the first indication) of the satellite switch (e.g., satSwitchWithReSync).

The UE may receive the NW configuration in an NTN-specific system information (e.g., SIB19) before performing the satellite switch. The UE may receive the NW configuration in an NTN-specific system information (e.g., SIB19) upon or after performing the satellite switch.

The UE may determine whether to trigger a TA report (e.g., for satellite switch) based on one or more of the following:
  (Receiving) the NW configuration;
  (Receiving) the first indication (e.g., satSwitchWithReSync);
  (Receiving) the indication of RACH type (e.g., RACH-based, RACH-less);
  The time information (e.g., t-service) for satellite switch;
  Performing/triggering of satellite switch;
  Performing DL synchronization;
  Acquiring System Frame Number (SFN) information;
  (Receiving/acquiring) a system information (e.g., Master Information Block (MIB), SIB1, SIB19); and/or
  Performing/triggering a RACH (procedure).

The UE may trigger a TA report (e.g., for satellite switch) when, upon, if, or in response to (the timing of) receiving the first indication (e.g., satSwitchWithReSync) of satellite switch. The UE may trigger a TA report (e.g., for satellite switch) when, upon, if, or in response to (the timing of) the time information (e.g., t-service) for the satellite switch. The UE may trigger a TA report (e.g., for satellite switch) when, upon, if, or in response to (the timing of) performing the satellite switch. The UE may trigger a TA report (e.g., for satellite switch) when, upon, if, or in response to (the timing of) performing DL synchronization, e.g., to the serving cell. The UE may trigger a TA report (e.g., for satellite switch) when, upon, if, or in response to (the timing of) triggering a RACH procedure for satellite switch.

If the UE does not receive the NW configuration, the UE may not trigger a TA report for satellite switch. If the UE receives the NW configuration, the UE may trigger a TA report for satellite switch, e.g., at one of the above timing.

If the UE performs a RACH-based satellite switch, the UE may trigger a TA report, e.g., at one of the above timing. If the UE performs a RACH-less satellite switch, the UE may not trigger a TA report. If the UE performs a RACH-less satellite switch, the UE may trigger a TA report, e.g., at one of the above timing.

In one example, the UE may receive a first indication (e.g., satSwitchWithReSync) of (enabling) unchanged PCI mechanism and/or satellite switch, e.g., via a first SIB19. The UE may (start to) perform DL synchronization (e.g., to the new satellite, to the serving cell) at, before, or upon a time information (e.g., t-service). The UE may consider a UL synchronization timer (e.g., T430) expires at the time information (e.g., t-service). The UE may receive a second SIB19 after DL synchronization. The UE may start the UL synchronization timer (e.g., T430) in response to receiving the second SIB19. The second SIB19 may comprise an NW configuration of TA report (e.g., ta-Report). The UE may not perform RACH after DL synchronization. The UE may not perform RACH based on or if the UE receives an indication of RACH-less procedure, e.g., along with the first indication (e.g., satSwitchWithReSync). The UE may trigger a TA report after DL synchronization. The UE may trigger the TA report based on or if the UE receives the NW configuration of TA report (e.g., ta-Report).

In one example, the UE may receive a first indication (e.g., satSwitchWithReSync) of (enabling) unchanged PCI mechanism and/or satellite switch, e.g., via a first SIB19. The UE may (start to) perform DL synchronization (e.g., to the new satellite, to the serving cell) at, before, or upon a time information (e.g., t-service). The UE may consider a UL synchronization timer (e.g., T430) expires at the time information (e.g., t-service). The UE may receive a second SIB19 after DL synchronization. The UE may start the UL synchronization timer (e.g., T430) in response to receiving the second SIB19. The second SIB19 may not comprise an NW configuration of TA report (e.g., ta-Report). The UE may perform RACH after DL synchronization. The UE may perform RACH based on or if the UE receives an indication of RACH-based procedure, e.g., along with the first indication (e.g., satSwitchWithReSync). The UE may perform RACH based on or if the UE does not receive an indication of RACH-less procedure, e.g., along with the first indication (e.g., satSwitchWithReSync). The UE may trigger a RACH procedure. The UE may not trigger a TA report after DL synchronization. The UE may not trigger a TA report in response to, if, upon, or after triggering the RACH procedure. The UE may not trigger the TA report based on or if the UE does not receive the NW configuration of TA report (e.g., ta-Report).

If a TA report is triggered, the UE may generate a TAR MAC CE, e.g., if UL-Shared Channel (SCH) resources are available for a new transmission and the UL-SCH resources can accommodate the TAR MAC CE plus its subheader as a result of logical channel prioritization.

If a TA report is triggered, the UE may trigger a scheduling request, e.g., if the UE receives a configuration (e.g., timingAdvanceSR, with value enabled).

Upon receiving the NTN-specific system information (e.g., SIB19), the UE would start or restart a validity timer (e.g., T430) with the validity duration (e.g., ntn-UISyncValidityDuration) from the subframe indicated by the epoch time (e.g., epochTime). The UE may acquire the NTN-specific system information (e.g., SIB19) before expiry/expiration of the validity timer. The UE would apply the epoch time (e.g., epochTime) as the start timing of the validity timer after/upon receiving the NTN-specific system information (e.g., SIB19). The UE would apply the validity duration (e.g., ntn-UISyncValidityDuration) as the length of the validity timer. The validity duration (e.g., ntn-UISyncValidityDuration) and/or validity timer (e.g., T430) may indicate the time duration when the satellite information or part of the satellite information (e.g., ephemerisInfo, ta-Info) is valid. Upon expiry of the validity timer in RRC connected mode, the UE may consider uplink synchronization is lost and/or acquire the NTN-specific system information (e.g., SIB19). In response to acquiring the NTN-specific system information (e.g., SIB19), the UE may consider uplink synchronization is obtained. If uplink synchronization is considered as lost, the UE may flush Hybrid Automatic Repeat Request (HARQ) buffers and may not perform UL transmission on the serving cell. If uplink synchronization is considered as obtained, the UE may perform UL transmission on the serving cell. When the validity timer is running, the serving cell may be considered uplink synchronization (e.g., uplink synchronization is obtained) in RRC connected mode. When the validity timer is not running and/or expires, the serving cell may be considered not uplink synchronization (e.g., uplink synchronization is lost) in RRC connected mode. The validity timer (e.g., T430) may be the UL synchronization timer.

For an unchanged PCI switch and/or satellite switch (with resynchronization), the UE would perform DL synchronization and UL synchronization to the target satellite. The network could resume transmissions after the satellite switch. The UE may receive an indication for the satellite switch (e.g., satSwitchWithReSync) and a time information (e.g., t-service). When the UE performs UL synchronization, the UE would consider UL synchronization lost with the current satellite (e.g., by considering T430 expiry), and then consider UL synchronization obtained with the target satellite. The UE may consider the validity timer (e.g., T430) expires at the time information (e.g., t-service). According to the current specifications (e.g., [3] 3GPP TS 38.321 V17.5.0 and [4] 3GPP TS 38.331 V17.5.0), the UE would flush all HARQ buffers upon UL synchronization loss. However, for the case of a satellite switch, flushing HARQ buffers would cause latency delay for transmission due to the fact that HARQ retransmission could not be performed after the satellite switch.

In the present invention, the UE may not flush one or more HARQ buffer(s) in response to unchanged PCI switch (or satellite switch). The indication of UL synchronization loss could be differentiated based on the cause (e.g., satellite switch, T430 expiry). When the UL synchronization is lost, the UE determines whether to flush the one or more HARQ buffer(s), based on whether the UL synchronization loss is due to the satellite switch. If the UL synchronization loss is due to the satellite switch, the UE stops UL transmission and/or not flush the one or more HARQ buffer(s). If the UL synchronization loss is not due to the satellite switch (e.g., T430 expiry), the UE stops UL transmission and flushes the one or more HARQ buffer(s).

The UE may not flush HARQ buffer(s) during the procedure of an unchanged PCI switch (or satellite switch). The UE may not flush HARQ buffer(s) based on (at least) a first condition. The UE may not perform any uplink transmission on the serving cell based on (at least) the first condition. The first condition may be one or more of the following:

If an indication of uplink synchronization loss is received from upper layer(s) due to T430 expiring at the time information (e.g., t-service);
If an indication of uplink synchronization loss is received from upper layer(s) for satellite switch;
If an indication of uplink synchronization loss due to satellite switch is received from upper layer(s);
If an indication of uplink synchronization loss is received from upper layer(s) during (a procedure of) satellite switch;
(If an indication of uplink synchronization loss is received from upper layer(s) and) if a procedure of satellite switch is ongoing;
(If an indication of uplink synchronization loss is received from upper layer(s) and) if a first indication (e.g., satSwitchWithReSync) of (enabling) satellite mechanism has been received/configured; and/or
(If an indication of uplink synchronization loss is received from upper layer(s) and) if a first indication (e.g., satSwitchWithReSync) of (enabling) satellite mechanism is present in SIB19.

The UE may flush (all) HARQ buffer(s) based on (at least) a second condition. The UE may not perform any uplink transmission on the serving cell based on (at least) the second condition. The second condition may be one or more of the following:

If an indication of uplink synchronization loss is received from upper layer(s) not due to T430 expiring at the time information (e.g., t-service);
If an indication of uplink synchronization loss is received from upper layer(s) not for satellite switch;
If an indication of uplink synchronization loss (not due to satellite switch) is received from upper layer(s);
If an indication of uplink synchronization loss is received from upper layer(s) not during (a procedure of) satellite switch;
(if an indication of uplink synchronization loss is received from upper layer(s) and) If a procedure of satellite switch is not ongoing;
(If an indication of uplink synchronization loss is received from upper layer(s) and) if a first indication (e.g., satSwitchWithReSync) of (enabling) satellite mechanism has not been received/configured; and/or
(If an indication of uplink synchronization loss is received from upper layer(s) and) if a first indication (e.g., satSwitchWithReSync) of (enabling) satellite mechanism is not present in SIB19.

In response to the satellite switch (e.g., if receiving the indication of satellite switch, during the satellite switch, upon initiation of the satellite switch, when the satellite switch is initiated, and/or if the satellite switch is initiated, at a cell stop time such as t-Service), the UE may:

Not flush a (UL) HARQ buffer (or all HARQ buffers) (e.g., for a serving cell, for all Serving Cells).

The HARQ buffer may be associated with a HARQ process. The UE may perform an initial transmission associated with the HARQ process (e.g., before the satellite switch). The UE may perform a retransmission (e.g., HARQ retransmission) associated with the HARQ process (e.g., after the satellite switch).

The UE (e.g., a MAC entity of the UE) may receive an indication of an uplink synchronization loss from an upper layer (e.g., an RRC layer). In response to receiving the indication of the uplink synchronization loss, the UE may not perform uplink transmission on a serving cell and/or determine whether to flush HARQ buffer(s) based on whether the uplink synchronization loss is due to the satellite switch. The UE may not perform uplink transmission on a serving cell regardless of whether the uplink synchronization loss is due to the satellite switch. The UE may not perform uplink transmission on a serving cell regardless cause of the UL synchronization loss. When the UE does not perform uplink transmission on a serving cell, the UE may stop and/or suspend UL transmission on the serving cell. The UE may determine whether to flush HARQ buffer(s) based on the cause of the UL synchronization loss. The cause of the UL synchronization loss may include the satellite switch. The cause of the UL synchronization loss may include T430 expiry. The UE may perform the determination (e.g., of whether to flush HARQ buffer(s) and/or whether the uplink synchronization loss is due to the satellite switch) in response to receiving the indication of the uplink synchronization loss. The UE may not flush the HARQ buffer(s) if (at least) the uplink synchronization loss is due to the satellite switch. The UE may flush the HARQ buffer(s) if (at least) the uplink synchronization loss is not due to the satellite switch. The UE may flush the HARQ buffer(s) if (at least) the uplink synchronization loss is due to T430 expiry.

For example, the UE may receive a system information (from a serving cell), wherein the system information includes at least an indication for satellite switch. The system information may be SIB19. The indication for the satellite switch may be satSwitchWithResync. The UE may initiate a procedure of satellite switch (with resynchronization) based on the indication for the satellite switch is included in the system information. The UE may indicate the uplink synchronization loss, in response to initiating the procedure of satellite switch. The UE may not perform uplink transmission on the serving cell, e.g., in response to the uplink synchronization loss. The UE may stop or suspend uplink transmission on the serving cell. The UE may not flush the HARQ buffers based on the uplink synchronization loss is due to the satellite switch, e.g., in response to the uplink synchronization loss.

For example, the UE may start or restart a timer upon receiving a system information (from a serving cell). The timer may be T430. The system information may be SIB19. The UE may indicate the uplink synchronization loss, in response to the timer expiry. The UE may not perform uplink transmission on the serving cell, e.g., in response to the uplink synchronization loss. The UE may stop or suspend uplink transmission on the serving cell. The UE may flush the HARQ buffers based on the uplink synchronization loss is not due to the satellite switch, e.g., in response to the uplink synchronization loss.

The UE may perform different actions (e.g., at least one or more of the actions mentioned above) for RACH-based satellite switch and RACH-less satellite switch.

The UE may determine whether to perform at least one or more of the above actions based on whether the satellite switch is RACH-based or RACH-less.

For example, the UE may perform at least one or more of the above actions in response to a satellite switch if the satellite switch is RACH-based and/or not perform the at least one or more of the above actions in response to an satellite switch if the satellite switch is RACH-less.

For example, the UE may perform at least one or more of the above actions in response to a satellite switch if the satellite switch is RACH-less and/or not perform the at least one or more of the above actions in response to an satellite switch if the satellite switch is RACH-based.

Different actions may be determined separately.

For example, the UE may perform a first action but not perform a second action in response to a satellite switch if the satellite switch is RACH-based and/or not perform the first action but perform the second action in response to a satellite switch if the satellite switch is RACH-less.

For example, the UE may perform a first action but not perform a second action in response to a satellite switch if the satellite switch is RACH-less and/or not perform the first action but perform the second action in response to a satellite switch if the satellite switch is RACH-based.

Any of the above and herein embodiments, concepts, methods, examples, behaviors, and/or events may be combined, in whole or in part, or applied simultaneously or separately.

The UE may receive configurations related to NTN (e.g., SIB19, NTN-Config). The UE may be configured with multiple connectivity, Carrier Aggregation (CA), Dual Connectivity (DC), SCell, and/or Secondary Cell Group (SCG).

The UE may be in a cell of NTN and/or a cell of TN. The UE may be connected to a cell of NTN and/or a cell of TN. The UE may camp on a cell of NTN and/or a cell of TN. The UE may be connected to a LEO, GEO, MEO, HEO, ATG, and/or HAPS. The UE may be connected to one or two networks (nodes). Throughout the present disclosure, a cell may be, may refer to an NTN cell or a TN cell.

The UE may be referred to as the UE, an RRC layer of the UE, a MAC entity of the UE, or a physical layer of the UE.

The UE may be an NR device. The UE may be a Long Term Evolution (LTE) device. The UE may be a Narrow-Band (NB)-Internet of Things (IoT) device. The UE may be an Enhanced Machine-Type Communication (eMTC) device. The UE may be a reduced capability device. The UE may be a mobile phone.

The UE may be a wearable device. The UE may be a sensor. The UE may be a stationary device. The UE may be an (unmanned) aerial vehicle.

The network may be a network. The network may be a base station. The network may be an access point. The network may be an eNB. The network may be a gNB. The network may be a gateway.

For the methods, alternatives, concepts, examples, and embodiments detailed above and herein, the following aspects and embodiments are possible.

Figure 18:
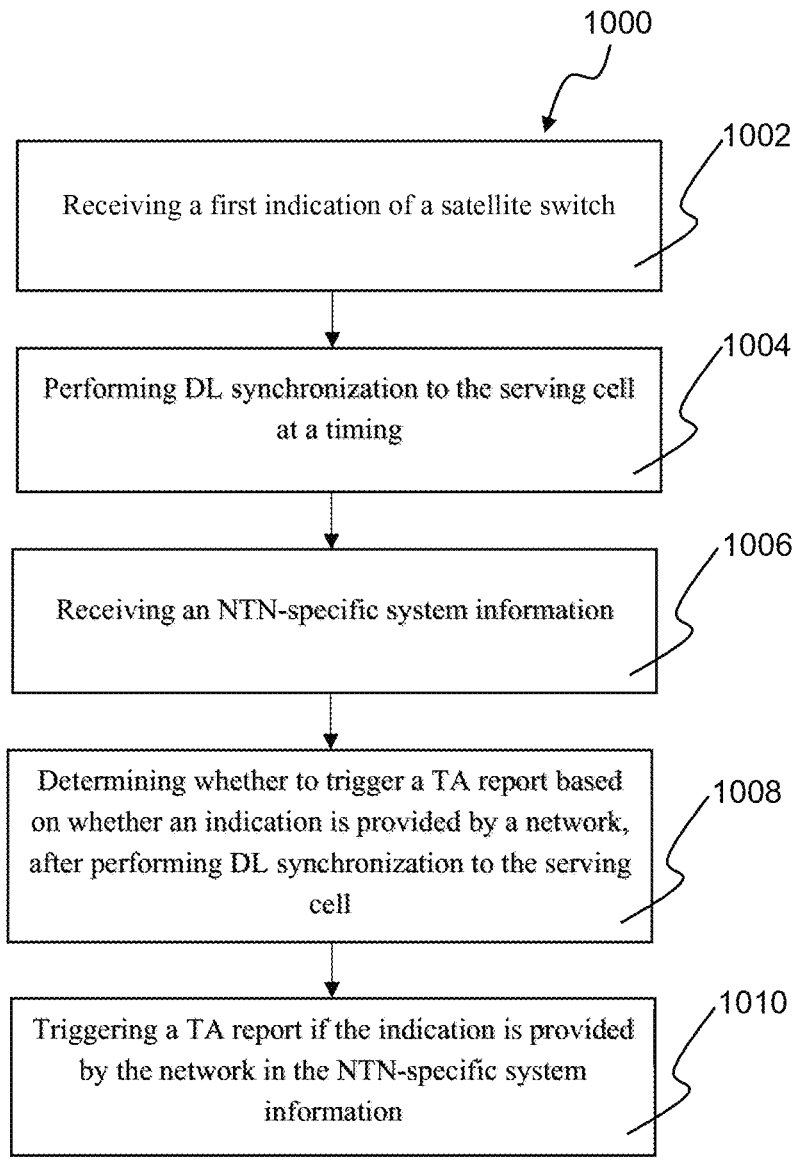
FIG. 18 is a flow diagram of a method of a UE comprising receiving a first indication of a satellite switch, performing DL synchronization to the serving cell at a timing, receiving an NTN-specific system information, determining whether to trigger a TA report based on whether an indication is provided by a network, after performing DL synchronization to the serving cell, and triggering a TA report if the indication is provided by the network in the NTN-specific system information, in accordance with embodiments of the present invention.

Referring to FIG. 18, with this and other concepts, systems, and methods of the present invention, a method 1000 for UE in a wireless communication system comprises receiving a first indication of a satellite switch (step 1002), performing DL synchronization to the serving cell at a timing (step 1004), receiving an NTN-specific system information (step 1006), determining whether to trigger a TA report based on whether an indication is provided by a network, after performing DL synchronization to the serving cell (step 1008), and triggering a TA report if the indication is provided by the network in the NTN-specific system information (step 1010).

In various embodiments, the UE does not perform a RACH procedure.

In various embodiments, the UE receives a second indication of RACH-less.

In various embodiments, the NTN-specific system information is SIB19.

In various embodiments, the first indication is satSwitchWithReSync.

In various embodiments, the indication is ta-Report.

In various embodiments, the timing is indicated by a time information for the satellite switch.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a first indication of a satellite switch; (ii) perform DL synchronization to the serving cell at a timing; (iii) receive an NTN-specific system information; (iv) determine whether to trigger a TA report based on whether an indication is provided by a network, after performing DL synchronization to the serving cell; and (v) trigger a TA report if the indication is provided by the network in the NTN-specific system information. Moreover, the CPU 308 can execute the program code 312 to perform all of the described actions, steps, and methods described above, below, or otherwise herein.

Referring back to FIGS. 3 and 4, in one or more embodiments from the perspective of an NW in a wireless communication system, the device 300 includes a program code 312 stored in memory 310 of the transmitter. The CPU 308 could execute program code 312 to: (i) transmit to a UE a first indication of a satellite switch; (ii) transmit to the UE an NTN-specific system information; (iii) transmit to the UE an indication of triggering a TA report; and (iv) receive, from the UE, a TA report if the indication is transmitted to the UE. Moreover, the CPU 308 can execute the program code 312 to perform all of the described actions, steps, and methods described above, below, or otherwise herein.

In [8] R2-2307623, it is proposed to discuss whether timeAlignmentTimer is considered expired at t-Service:

| Satellite synchronization window |
| --- |
| The UE behavior for synchronizing to the new satellite can be handled by existing two synchronization timers, i.e., UL synchronization timer and timeAlignmentTimer.<br>At or after t-Start, the UE should start searching for the SSB from the new satellite and synchronize to it. However, if RACH-based solution is used, there is no need for such synchronization gap because when the UE finishes synchronizing with new satellite and gets ready for UL/DL transmission, the UE can simply trigger RACH procedure. To trigger RACH, a condition can be added to trigger TA MAC CE at t-Service. How long the network can wait for UE to come back can be handled with existing UL synchronization timer, timeAlignmentTimer and RLF timers. For RACH-based solution, at t-Service or t-Start, the UE can assume the UL synchronization timer (SIB19 validity) expired and timeAlignmentTimer expired. Then UE starts the UL synchronization timer after acquiring SIB19 of the new satellite and can start the timeAlignmentTimer after receiving RAR. Network would also be aware that these timers are expired and utilize resource efficiently until UE initiates RACH. If UE fails to synchronize with the new satellite, existing RLF procedure can be used. However, it is not necessary to do anything to the running timeAlignmentTimer. Regardless the UE will follow the existing procedure if timeAlignmentTimer expires.<br>Proposal 3 If RACH-based solution is used, the UE considers UL synchronization timer expired at t-Service (current cell stop time) to stop any UL operation. Discuss whether timeAlignmentTimer is also considered expired at t-Service.<br>Proposal 4 If RACH-based solution is used, the UE triggers RACH after synchronizing with the new satellite and there is no need to define a synchronization gap or duration (e.g., t-gap). |

For unchanged PCI switch (or satellite switch), if time-AlignmentTimer is considered expired (e.g., at t-Service), the following UE actions upon expiry of timeAlignment-Timer would be performed (e.g., at t-Service), as specified in the current NR MAC specification (e.g., [3] 3GPP TS 38.321 V17.5.0):
  Flush (all) HARQ buffer(s) (for all Serving Cells);
  (notify RRC to) Release Physical Uplink Control Channel (PUCCH) (for all Serving Cells, if configured);
  (notify RRC to) Release Sounding Reference Signal (SRS) (for all Serving Cells, if configured);
  Clear (any) configured downlink assignments;
  Clear (any) configured uplink grants; and
  Clear (any) Physical Uplink Shared Channel (PUSCH) resource for semi-persistent CSI reporting.

And the following UE actions would be performed upon MAC notifying RRC when timeAlignmentTimer expires, as specified in the current NR RRC specification (e.g., [4] 3GPP TS 38.331 V17.5.0):
  Upon receiving a PUCCH release request from lower layers, (for all bandwidth parts of an indicated serving cell) the UE shall:
  release PUCCH-CSI-Resources configured in Channel State Information (CSI)-ReportConfig; and release SchedulingRequestResourceConfig instances configured in PUCCH-Config.
  Upon receiving an SRS release request from lower layers, (for all bandwidth parts of an indicated serving cell) the UE shall:
  release SRS-Resource instances configured in SRS-Config.

However, the satellite switch is mainly used for the scenario of a satellite switch without changing the gNB, and the benefit of the satellite switch (compared to handover) is to save the signaling overhead by not having to send an RRC reconfiguration message to the UE. The consequence of considering timeAlignmentTimer expired in the satellite switch (e.g., at t-Service) is that the NW needs to transmit an RRC reconfiguration message (and/or) other signaling (e.g., MAC CE/Physical Downlink Control Channel (PDCCH), for activation, etc.) to reconfigure (and/or activate) PUCCH, SRS, configured downlink assignment(s), configured uplink grant(s), and/or PUSCH resource for semi-persistent CSI reporting later (e.g., after satellite switch). In such a case, the benefit of signaling overhead reduction caused by satellite switch is minimized.

To solve the issue, in response to an unchanged PCI switch or a satellite switch (e.g., if receiving the indication of satellite switch, during the satellite switch (procedure), upon initiation of the satellite switch (procedure), when the satellite switch (procedure) is initiated, and/or if the satellite switch (procedure) is initiated), a UE could keep timeAlignmentTimer (from expiry), PUCCH resource and/or configuration, SRS resource and/or configuration, configured downlink assignment(s), configured uplink grant(s), and/or PUSCH resource for semi-persistent CSI reporting. In response to the satellite switch (e.g., if receiving the indication of satellite switch, during the satellite switch (procedure) and/or if the satellite switch (procedure) is initiated), a UE may keep and/or may not release following configuration(s) and/or resource(s): PUCCH resource/configuration, SRS resource/configuration, configured downlink assignment, configured uplink grant and/or PUSCH resource for semi-persistent CSI reporting.

In response to the satellite switch (e.g., if receiving the indication of satellite switch, during the satellite switch (procedure), upon initiation of the satellite switch (procedure), when the satellite switch (procedure) is initiated, and/or if the satellite switch (procedure) is initiated, at a cell stop time such as t-Service), the UE may:
  Not consider a time alignment timer expired;
  Not perform at least one or more actions that is performed when the time alignment timer expires;
  Continue the time alignment timer (or keep the time alignment timer running);
  Consider the time alignment timer is running;
  Stop (or suspend) the time alignment timer (e.g., if running); and/or
  Start (or restart) the time alignment timer.

The time alignment timer may be associated with PTAG of the UE. The time alignment timer may be a timeAlignmentTimer.

The UE may start (or resume) the time alignment timer when/if/upon/in response to at least one or more of the following:
  (successful) Completion of the satellite switch;
  (successful) Completion of the RA procedure;
  Receiving a RAR (random access response);
  Receiving a Timing Advance Command, e.g., included in RAR;
  Applying a (updated) TA value;
  Acquiring (updated) SIB19 (of serving cell);
  Acquiring (updated) ephemeris (of serving cell); and/or
  UL and/or DL synchronization with the serving cell.

The at least one or more actions is performed by the UE when the time alignment timer expires. The at least one or more actions may comprise:
  Flush a HARQ buffer (or all HARQ buffers) (e.g., for all Serving Cells);

(notify RRC to) Release PUCCH (e.g., a PUCCH resource and/or configuration, for all Serving Cells, if configured);

(notify RRC to) Release SRS (e.g., a SRS resource and/or configuration, for all Serving Cells, if configured);

Clear a configured downlink assignment (or any configured downlink assignments);

Clear a configured uplink grant (or any configured uplink grants);

Clear (any) PUSCH resource for semi-persistent CSI reporting;

Release PUCCH-CSI-Resources configured in CSI-ReportConfig (e.g., for all bandwidth parts of an indicated serving cell);

Release SchedulingRequestResourceConfig instances configured in PUCCH-Config (e.g., for all bandwidth parts of an indicated serving cell); and/or Release SRS-Resource instances configured in SRS-Config (e.g., for all bandwidth parts of an indicated serving cell).

In response to the satellite switch (e.g., if receiving the indication of satellite switch, during the satellite switch (procedure), upon initiation of the satellite switch (procedure), when the satellite switch (procedure) is initiated, and/or if the satellite switch (procedure) is initiated, at a cell stop time such as t-Service), the UE may:

Not release PUCCH (e.g., a PUCCH resource and/or configuration);

Keep (or continue) (applying or using) the current (configured) PUCCH resource and/or configuration; and/or Suspend the PUCCH resource and/or configuration.

The UE may resume the PUCCH resource and/or configuration when/if/upon/in response to at least one or more of the following:

(Successfully) complete the satellite switch;

(Successfully) complete the RA procedure;

Receiving a RAR (random access response);

Receiving a Timing Advance Command, e.g., included in RAR;

Applying a (updated) TA value;

Acquiring (updated) SIB19 (of serving cell);

Acquiring (updated) ephemeris (of serving cell); and/or

Performing UL and/or DL synchronization with the serving cell.

The PUCCH resource and/or configuration may be (or comprise):

PUCCH-Config (and/or a configuration in PUCCH-Config);

PUCCH resource (and/or resource set);

PUCCH resource for scheduling request;

PUCCH resource for CSI report;

PUCCH-CSI-Resources configured in CSI-ReportConfig (e.g., for all bandwidth parts of an indicated serving cell); and/or SchedulingRequestResourceConfig instances configured in PUCCH-Config (e.g., for all bandwidth parts of an indicated serving cell).

In response to the satellite switch (e.g., if receiving the indication of satellite switch, during the satellite switch (procedure), upon initiation of the satellite switch (procedure), when the satellite switch (procedure) is initiated, and/or if the satellite switch (procedure) is initiated, at a cell stop time such as t-Service), the UE may:

Not release SRS (e.g., a SRS resource and/or configuration);

Keep (or continue) (applying or using) the current (configured) SRS resource and/or configuration; and/or Suspend the SRS resource and/or configuration.

The UE may resume the SRS resource and/or configuration when/if/upon/in response to at least one or more of the following:

(Successful) completion of the satellite switch;

(Successful) completion of the RA procedure;

Receiving a RAR (random access response);

Receiving a Timing Advance Command, e.g., included in RAR;

Applying a (updated) TA value;

Acquiring (updated) SIB19 (of serving cell);

Acquiring (updated) ephemeris (of serving cell); and/or

UL and/or DL synchronization with the serving cell.

The SRS resource and/or configuration may be (or comprise):

SRS-config (and/or a configuration in PUCCH-Config);

PUCCH resource (and/or resource set); and/or

SRS-Resource instances configured in SRS-Config.

In response to the satellite switch (e.g., if receiving the indication of satellite switch, during the satellite switch (procedure), upon initiation of the satellite switch (procedure), when the satellite switch (procedure) is initiated, and/or if the satellite switch (procedure) is initiated, at a cell stop time such as t-Service), the UE may:

Not clear a configured downlink assignment (or any configured downlink assignments);

Keep (or continue) (applying or using) the current (configured) resource and/or configuration of configured downlink assignment(s);

Suspend the resource and/or configuration of configured downlink assignment(s);

Not clear a configured uplink grant (or any configured uplink grants);

Keep (or continue) (applying or using) the current (configured) resource and/or configuration of configured uplink grant(s);

Suspend the resource and/or configuration of configured uplink grant(s); and/or

Consider the configured uplink grant(s) and/or configured downlink assignment(s) deactivated.

The UE may resume (or activate) the resource and/or configuration of configured downlink assignment(s) and/or configured uplink grant(s) when/if/upon/in response to at least one or more of the following:

(Successful) completion of the satellite switch;

(Successful) completion of the RA procedure;

Receiving a RAR (random access response);

Receiving a Timing Advance Command, e.g., included in RAR;

Applying a (updated) TA value;

Acquiring (updated) SIB19 (of serving cell);

Acquiring (updated) ephemeris (of serving cell); and/or

UL and/or DL synchronization with the serving cell.

The configured uplink grant may a configured grant Type 1. The configured uplink grant may be a configured grant Type 2. The configured downlink assignment may be DL Semi-Persistent Scheduling (SPS).

The configured grant Type 1 and Type 2 may be handled differently in the satellite switch.

In response to the satellite switch (e.g., if receiving the indication of satellite switch, during the satellite switch (procedure), upon initiation of the satellite switch (procedure), when the satellite switch (procedure) is initiated, and/or if the satellite switch (procedure) is initiated, at a cell stop time such as t-Service), the UE may:

Not clear a (or any) PUSCH resource for semi-persistent CSI reporting;

Keep (or continue) (applying or using) the current (configured) PUSCH resource for semi-persistent CSI reporting; and/or Suspend the (PUSCH resource for) semi-persistent CSI reporting.

The UE may resume the (PUSCH resource for) semi-persistent CSI reporting when/if/upon/in response to at least one or more of the following:

(Successful) completion of the satellite switch;
(Successful) completion of the RA procedure;
Receiving a RAR (random access response);
Receiving a Timing Advance Command, e.g., included in RAR;
Applying a (updated) TA value;
Acquiring (updated) SIB19 (of serving cell);
Acquiring (updated) ephemeris (of serving cell); and/or
UL and/or DL synchronization with the serving cell.

Suspending a resource and/or configuration may be (or comprise) to stop using (or applying) the resource and/or configuration (temporarily, e.g., for a period of time, until it is resumed). The resource and/or configuration is kept (or not released) when it is suspended.

Resuming a resource and/or configuration may be (or comprise) to start using (or applying) the (suspended) resource and/or configuration.

For the methods, alternatives, concepts, examples, and embodiments detailed above and herein, the following aspects and embodiments are possible.

Figure 19:
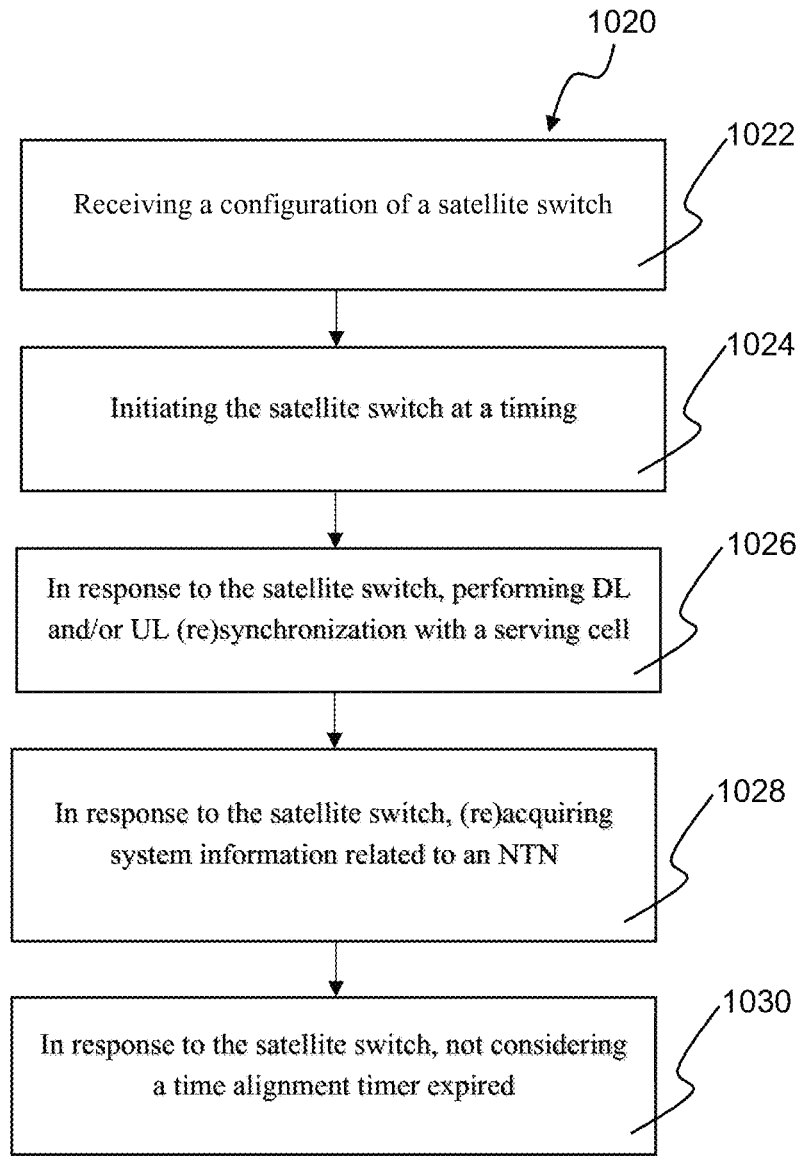
FIG. 19 is a flow diagram of a method of a UE comprising receiving a configuration of a satellite switch, initiating the satellite switch at a timing, in response to the satellite switch, performing DL and/or UL (re)synchronization with a serving cell, in response to the satellite switch, (re)acquiring system information related to an NTN, and in response to the satellite switch, not considering a time alignment timer expired, in accordance with embodiments of the present invention.

Referring to FIG. 19, with this and other concepts, systems, and methods of the present invention, a method 1020 for UE in a wireless communication system comprises receiving a configuration of a satellite switch (step 1022), initiating the satellite switch at a timing (step 1024), in response to the satellite switch, performing DL and/or UL (re)synchronization with a serving cell (step 1026), in response to the satellite switch, (re)acquiring system information related to an NTN (step 1028), and in response to the satellite switch, not considering a time alignment timer expired (step 1030).

In various embodiments, the UE stops or suspends the time alignment timer in response to the satellite switch.

In various embodiments, the UE does not flush one or more HARQ buffer(s) associated with a HARQ process in response to the satellite switch.

In various embodiments, the UE keeps (or suspends) a PUCCH resource and/or configuration in response to the satellite switch.

In various embodiments, the PUCCH resource and/or configuration is for a scheduling request.

In various embodiments, the PUCCH resource and/or configuration is for a CSI report.

In various embodiments, the UE keeps (or suspends) an SRS resource and/or configuration in response to the satellite switch.

In various embodiments, the UE keeps (or suspends) a configured uplink grant and/or a configured downlink assignment in response to the satellite switch.

In various embodiments, the UE keeps (or suspends) CSI report in response to the satellite switch.

In various embodiments, the configuration of satellite switch is an indication of an enabled satellite change.

In various embodiments, the timing is indicated by a cell stop serving time.

In various embodiments, the timing is indicated with the configuration of the satellite switch.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a configuration of a satellite switch; (ii) initiate the satellite switch at a timing; (iii) in response to the satellite switch, perform DL and/or UL (re)synchronization with a serving cell; (iv) in response to the satellite switch, (re)acquire system information related to an NTN; and (v) in response to the satellite switch, not consider a time alignment timer expired. Moreover, the CPU 308 can execute the program code 312 to perform all of the described actions, steps, and methods described above, below, or otherwise herein.

The UE would use a timer (e.g., a UL synchronization timer, a validity timer) to maintain UL synchronization (e.g., for a serving cell) and/or validity of NTN information based on the NTN information. The UE would start or restart a UL synchronization timer (e.g., T430) with a validity duration (e.g., ntn-UISyncValidityDuration) from the subframe indicated by corresponding epoch time (e.g., epochTime), wherein the validity duration (e.g., ntn-UISyncValidityDuration) and epoch time (e.g., epochTime) are provided for the serving cell. The UE would apply the epoch time (e.g., epochTime) as the start timing of the UL synchronization timer (e.g., T430). The UE would apply the validity duration (e.g., ntn-UISyncValidityDuration) as the length of the UL Synchronization timer (e.g., T430). The UL synchronization timer (e.g., T430) may be started and/or running based on the NTN information, e.g., of a serving cell. The validity duration (e.g., ntn-UISyncValidityDuration) and/or UL synchronization timer (e.g., T430) may indicate the time duration when the satellite information or part of the satellite information (e.g., ephemerisInfo, ta-Info) is valid.

For example, when the UL synchronization timer (e.g., T430) is running, the (part of) satellite information may be considered as valid. When the UL synchronization timer (e.g., T430) is not running, the (part of) satellite information may be considered as not valid. The UL synchronization timer (e.g., T430) may indicate the time duration when the UL synchronization is obtained or maintained based on satellite information or part of the satellite information (e.g., ephemerisInfo, ta-Info).

For example, when the UL synchronization timer (e.g., T430) is running, the UL may be considered as synchronized or the UL synchronization may be considered as obtained. When the UL synchronization timer (e.g., T430) is started, the UL may be considered as synchronized or the UL synchronization may be considered as obtained. The UE may consider the UL synchronization (as/is obtained) in response to starting the UL synchronization timer (e.g., T430). When the UL synchronization timer (e.g., T430) is not running, the UL may be considered as not synchronized or the UL synchronization may be considered as lost. When the UL synchronization timer (e.g., T430) is stopped and/or (is considered as) expired, the UL may be considered as not synchronized or the UL synchronization may be considered as lost. The UE may consider the UL synchronization as/is lost and/or consider the UL synchronization loss in response to stopping the UL synchronization timer (e.g., T430).

Based on current specifications (e.g., [3] 3GPP TS 38.321 V17.5.0 and [9] 3GPP TS 38.331 V17.6.0), upon receiving SIB19, the UE starts the UL synchronization timer (e.g., T430) based on the serving cell's NTN configuration. The UE stops the UL synchronization timer (e.g., T430) and then starts the UL synchronization timer (e.g., T430) in response to receiving a handover command (e.g., RRCReconfiguration with ReconfigurationWithSync). When the UE executes and/or performs the handover (or reconfiguration with sync), the UE stops the UL synchronization timer (e.g., T430). Then the UE starts the UL synchronization timer (e.g., T430) based on the target cell's NTN configuration.

The UE would reacquire the SIB19 before expiry of the UL synchronization timer. Upon expiry of the UL Synchronization timer in RRC connected mode, the UE may consider uplink synchronization is lost and acquire the SIB19. In response to acquiring the SIB19, the UE may consider uplink synchronization is obtained. If uplink synchronization is considered as lost, the UE may flush HARQ buffers and may not perform UL transmission on the serving cell. If uplink synchronization is considered as obtained, the UE may perform UL transmission on the serving cell. When the UL synchronization timer is running, the serving cell may be considered uplink synchronization (e.g., uplink synchronization is obtained) in RRC connected mode. When the UL synchronization timer is not running and/or expires, the serving cell may be considered not uplink synchronization (e.g., uplink synchronization is lost) in RRC connected mode.

Throughout the present disclosure, the UL synchronization timer may be a timer for the serving cell (or source cell). The UL Synchronization timer may be a UL synchronization timer for the target cell (or neighbor cell). The UL synchronization timer may be a validity timer. The UL synchronization timer may be the timer T430. The UL synchronization timer may be used to maintain/evaluate UL synchronization, e.g., when the UE is in NTN, when the UE is connected to a satellite. The UL synchronization timer may indicate/handle the time duration when the (associated) assistance information is valid. The UL synchronization timer may indicate/handle the time duration when the UE can apply the (associated) satellite information, e.g., without acquiring new satellite information. The UL synchronization timer may be used in NTN. The UL synchronization timer (e.g., T430) may not be used in TN. The UL synchronization timer (e.g., T430) may be an NTN-specific timer. The UL synchronization timer may be different from a TA timer (e.g., TimeAlignmentTimer). The UL synchronization timer may not be used to maintain UL TA. The UL synchronization timer may be associated to a cell. The UL synchronization timer may not be associated to a TA group. The UE may consider UL is synchronized when the (associated) satellite information is valid.

The UE may perform (or initiate) the unchanged PCI switch or satellite switch, e.g., in response to (receiving) the indication (e.g., satSwitchWithReSync), in response to receiving a system information including the indication (e.g., satSwitchWithReSync). The UE may perform (or initiate) the unchanged PCI switch or satellite switch, e.g., at a specific time, at t-Service, before t-Service, after t-Service, after t-Start, after receiving the system information. The specific time may be indicated by the network. The specific time may be indicated in system information (e.g., SIB19). The specific time may be (or indicate) a cell stop time (e.g., t-Service). The specific time may be (or indicate) a switch start time (e.g., t-Start). The cell stop time (e.g., t-Service) may be (or indicate) when a cell provided via NTN is going to stop serving the area it is currently covering. The switch start time (e.g., t-Start) may be (or indicate) when a second satellite is going to serving the area (or cell) a first satellite is currently covering or serving. The switch start time (e.g., t-Start) may be (or indicate) when an unchanged PCI switch or satellite switch could be started or performed. Throughout the present disclosure, the t-Start may be a switch start time and the t-Service may be a cell stop time. Throughout the present disclosure, the t-Start may be represented by t-Service minus t-Gap.

The unchanged PCI switch or satellite switch may be or comprise soft satellite switching and/or hard satellite switching. The soft satellite switching or hard satellite switching may be explicitly or implicitly indicated by the NW. The NW may provide an indication of satellite switching type (e.g., soft satellite switching or hard satellite switching). The NW may provide t-Start and/or SSB information of soft satellite switching. The indication may be a parameter, t-Start and/or SSB information.

Figure 20:
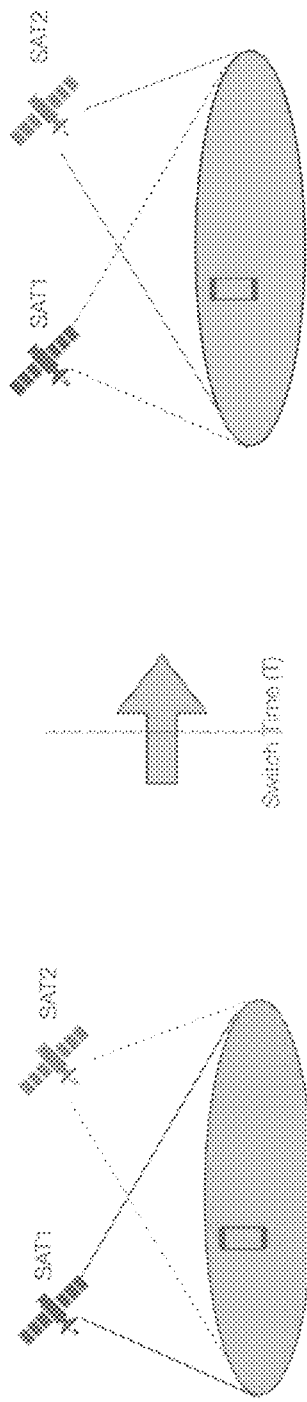
FIG. 20 is an example diagram of hard satellite switching, in accordance with embodiments of the present invention.

For hard satellite switching, the UE may connect to (or synchronize with) the new satellite (e.g., the target satellite, the second satellite) after disconnecting to the old satellite (e.g., the source satellite, the first satellite). An example of hard satellite switching is shown in FIG. 20 (quoted from [10] R2-2310307) and FIG. 21. The serving satellite may be switched at a time point (e.g., switch time in FIG. 20, t-Service). The time point may be t-Service. A first satellite (e.g., SAT1 in FIG. 20) may be the serving satellite before the satellite switching and/or the time point. A second satellite (e.g., SAT2 in FIG. 20) may be the serving satellite after the satellite switching and/or the time point. The first satellite and the second satellite may serve the same cell (e.g., with the same PCI). The first satellite may be a source satellite. The second satellite may be a target satellite. The UE may receive a first indication (e.g., satSwitchWithReSync) of (enabling) unchanged PCI mechanism or satellite switch via a first SIB19. The UE may start or restart a UL synchronization timer (e.g., T430) in response to receiving the first SIB19. The UE may stop transmission(s) to the first satellite at t-Service and start to acquire/perform DL synchronization to the second satellite after t-Service. The UE may consider the UL synchronization timer (e.g., T430) as expired at t-Service. The UE may acquire a second SIB19 after DL synchronization, e.g., in response to expiry of the UL synchronization timer (e.g., T430). The second SIB19 comprise satellite information after switching the serving satellite. The UE may start the UL synchronization timer (e.g., T430) in response to receiving the second SIB19, e.g., based on the satellite information. The UE may perform an RA procedure or not perform the RA procedure, e.g., based on NW indication, after DL synchronization and when the UL synchronization timer (e.g., T430) is running. The UE may acquire UL synchronization to the second satellite after DL synchronization, when the UL synchronization timer (e.g., T430) is running and/or performing the RA procedure.

Figure 22:
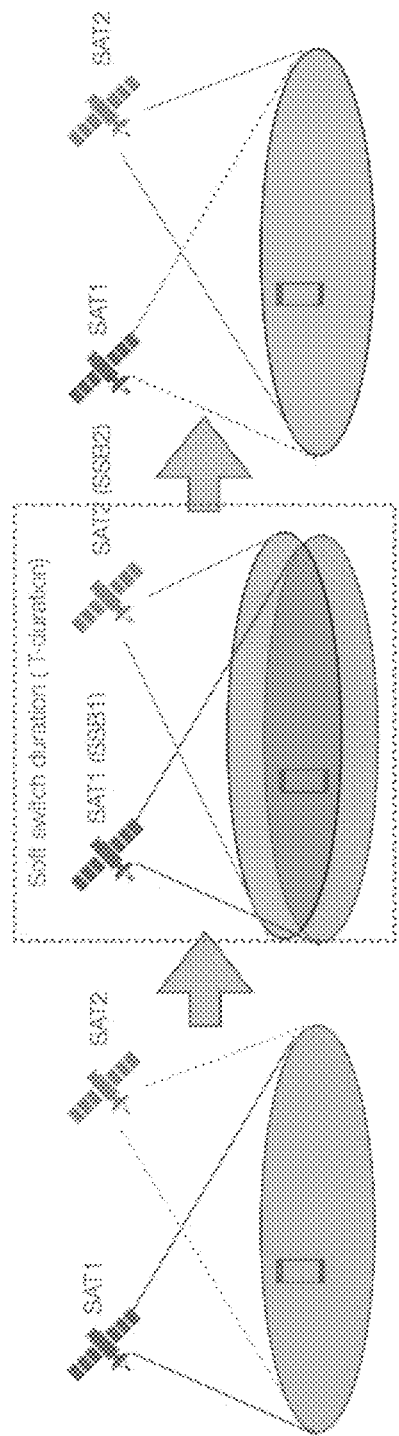
FIG. 22 is an example diagram of soft satellite switching, in accordance with embodiments of the present invention.

For soft satellite switching, the UE may connect to (or synchronize with) the new satellite (e.g., the target satellite, the second satellite) before disconnecting to the old satellite (e.g., the source satellite, the first satellite). An example of soft satellite switching is shown in FIG. 22 (quoted from [10] R2-2310307) and FIG. 23. The serving satellite may be switched during a time duration (e.g., T-duration in FIG. 22, between t-Start and t-Service). Both the first satellite (e.g., SAT1 in FIG. 22) and the second satellite (e.g., SAT2 in FIG. 22) provide service/coverage for the same area during the time duration. The time duration may start from t-Start and end at t-Service. The first satellite may be the serving satellite before satellite switching and/or t-Start. The second satellite (e.g., SAT2 in FIG. 20) may be the serving satellite after the satellite switching and/or t-Service. The first satellite and the second satellite may serve the same cell (e.g., with the same PCI). The first satellite may be a source satellite. The second satellite may be a target satellite. The UE may receive a first indication (e.g., satSwitchWith- ReSync) of (enabling) unchanged PCI mechanism or satellite switch via a first SIB19. The UE may start or restart a UL synchronization timer (e.g., T430) in response to receiving the first SIB19. The UE may start to acquire DL synchronization to the second satellite after t-Start (and before t-Service). The UE may stop transmission(s) to the first satellite at t-Service and/or after DL synchronization. The UE may consider the UL synchronization timer (e.g., T430) as expired at t-Service. The UE may acquire a second SIB19 after DL synchronization, e.g., in response to expiry of the UL synchronization timer (e.g., T430). The second SIB19 comprises satellite information after switching the serving satellite. The UE may start the UL synchronization timer (e.g., T430) in response to receiving the second SIB19, e.g., based on the satellite information. The UE may perform an RA procedure or not perform the RA procedure, e.g., based on NW indication, after DL synchronization and when the UL synchronization timer (e.g., T430) is running. The UE may acquire UL synchronization to the second satellite after DL synchronization, when the UL synchronization timer (e.g., T430) is running and/or performing the RA procedure.

Figure 21:
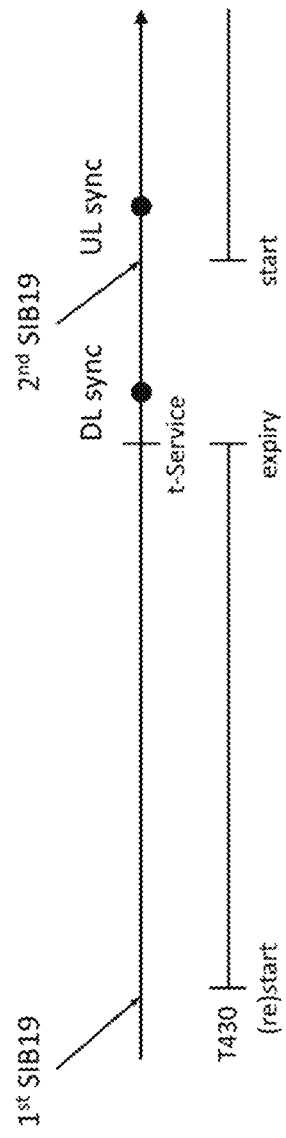
FIG. 21 is an example diagram of hard satellite switching, in accordance with embodiments of the present invention.
Figure 23:
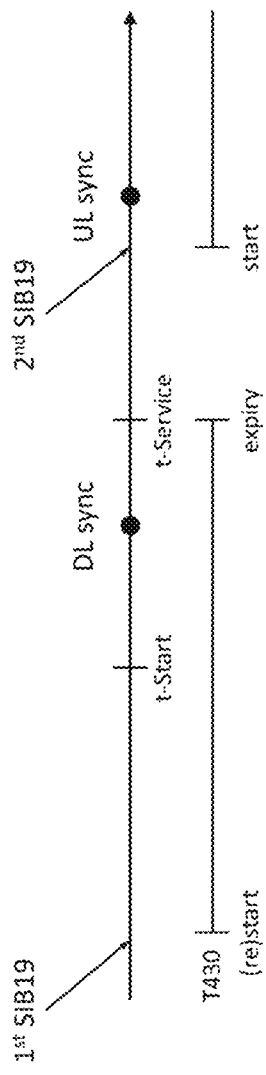
FIG. 23 is an example diagram of soft satellite switching, in accordance with embodiments of the present invention.

For a RACH-based satellite switch, the UE may trigger an RA procedure immediately after DL synchronizing with the new satellite. As for a RACH-less satellite switch, the UE could perform UL synchronization immediately after DL synchronizing with the new satellite. However, for hard satellite switching as shown in FIG. 21, the UE considers a UL synchronization timer (e.g., T430) as expired at t-Service and starts the UL synchronization timer (e.g., T430) upon acquiring new SIB19 after DL synchronization. The UE could not perform UL transmission when the UL synchronization timer (e.g., T430) is not running. The UE could not perform the triggered RA procedure or UL synchronization before the UL synchronization timer (e.g., T430) is started. There would be a time gap between DL synchronization and performing UL synchronization. For soft satellite switching as shown in FIG. 23, the time gap between DL synchronization and UL synchronization would be longer, since the UE could perform DL synchronization before t-Service.

In the latest RAN2 meeting (RAN2 #123bis meeting), it was agreed that the network broadcasts target satellite information (e.g., NTN-Config) in SIB19 in advance to the UE before satellite switching. The UE could receive target satellite information before satellite switching rather than after performing DL synchronization to the target satellite. However, based on current mechanism according to RAN2 agreements, the UE still needs to wait for acquiring new SIB19 to start the UL synchronization timer (e.g., T430). Based on expiry of the UL synchronization timer (e.g., T430), the UE could not perform UL synchronization even though the UE has valid target satellite information. The UE may consider the UL synchronization timer (e.g., T430) expiry upon t-Service. In response to the UL synchronization timer (e.g., T430) expiry, the UE considers UL synchronization is lost (and acquires SIB19). In response to UL synchronization loss, the UE flushes all HARQ buffers. After DL synchronization, the UE starts T430 and considers UL synchronization is obtained.

Throughout the present disclosure, the target NTN information may be or be referred to NTN information for the target satellite. The source NTN information may be or be referred to NTN information for the source satellite. The target NTN information may be explicitly provided in SIB19. The target NTN information may be implicitly provided in SIB19 with a parameter to indicate one of the NTN information in SIB19. The target NTN information may be provided in a list of a neighbor cell. The SIB19 may include (at least) a first NTN information, a second NTN information, and/or a third NTN information. The first NTN information may be for the source satellite. The second NTN information may be for the target satellite. The third NTN information may be for the source satellite. The first NTN information may be for a serving cell. The second NTN information may be for the serving cell, a target cell, or a neighbor cell. The third NTN information may be for a neighbor cell. The first NTN information, second NTN information, and/or third NTN information may be different or the same NTN information.

To solve the issue, the UE could determine whether to consider a UL synchronization timer (e.g., T430) as expired at a specific timing based on a condition. The specific timing may be the timing that the source satellite would stop to serve current cell. The specific timing may be t-Service. The specific timing may be the timing that the UE starts to perform DL synchronization, perform the satellite switch, and/or switch to the target satellite. The specific timing may be the timing that the UE performs DL synchronization, performs unchanged PCI switch, the satellite switch, and/or switches to the target satellite.

The UE may not consider the UL synchronization timer (e.g., T430) as expired during a procedure of a PCI unchanged switch and/or a satellite switch, e.g., based on the condition. The UE may keep the UL synchronization timer (e.g., T430) running during a procedure of the PCI unchanged switch and/or satellite switch, e.g., based on the condition. The UE may not consider the UL synchronization timer as expired during a procedure of the PCI unchanged switch and/or satellite switch. In response to the UL synchronization timer expiry, if a procedure of the PCI unchanged switch and/or satellite switch is ongoing, the UE may (re)start the UL synchronization timer.

Throughout the present disclosure, the procedure of the PCI unchanged switch and/or satellite switch may be started when the UE (determine to) performs DL synchronization, e.g., to the target satellite. The procedure of the PCI unchanged switch and/or satellite switch may be started when the UE receives an indication of the PCI unchanged switch and/or satellite switch. The procedure of the PCI unchanged switch and/or satellite switch may be started when the UE receives a system information including the indication of the PCI unchanged switch and/or satellite switch. The procedure of the PCI unchanged switch and/or satellite switch may be completed when the UE acquires UL synchronization. The UE may acquire the UL synchronization when the UE considers the UL synchronization is obtained. The procedure of the PCI unchanged switch and/or satellite switch may be completed when the UE completes an RA procedure. The procedure of the PCI unchanged switch and/or satellite switch may be completed when the UE considers an RA procedure successfully completed. The procedure of the PCI unchanged switch and/or satellite switch may be completed when the UE completes a RACH-less procedure. The procedure of the PCI unchanged switch and/or satellite switch may be completed when the UE (successfully) receives a PDCCH transmission addressed to a Cell Radio Network Temporary Identifier (C-RNTI) and/or a Random Access Radio Network Temporary Identifier (RA-RNTI).

The condition may be one of or a combination of the following:

Whether an NTN information for target satellite has been received (or is received) before the unchanged PCI switch and/or the satellite switch;

Whether an NTN information for the target satellite has been received (or is received) in SIB19;

Whether an NTN information for the target satellite has been received (or is received) along with an indication of the unchanged PCI switch and/or the satellite switch.

Whether an NTN information for the target satellite has been received (or is received) from the source satellite;

Whether an NTN information for the target satellite is valid or available at the specific timing;

Whether two NTN information for the serving cell (e.g., one for the source satellite and one for the target satellite) has been provided (or is provided) in SIB19;

Whether an indication of NTN information or UL synchronization is provided in SIB19; and/or Whether the UL synchronization timer is running based on NTN information of the target satellite.

The UE may check the condition at the specific timing. The UE may make the determination at the specific timing. The UE may consider the UL synchronization timer (e.g., T430) as expired at the specific timing. The UE may not consider the UL synchronization timer (e.g., T430) as expired at the specific timing based on, in response to, or if (at least) the condition is fulfilled. The UE may consider the UL synchronization timer (e.g., T430) as expired at the specific timing based on, in response to, or if (at least) the condition is not fulfilled. For example, the UE may receive an SIB19 comprising an indication of the satellite switch and (at least) an NTN information for the target satellite. The UE may start a procedure of the PCI unchanged switch and/or satellite switch. The UE may not consider a UL synchronization timer (e.g., T430) as expired in response to the NTN information for the target satellite is available.

To solve the issue, the UE may stop a UL synchronization timer (e.g., T430) and/or (re)start the UL synchronization timer (based on a target satellite information) during a procedure of a PCI unchanged switch and/or satellite switch. The UE may stop and/or (re)start the UL synchronization timer based on (at least) one or more of the following:

Upon, when, or in response to receiving a system information (e.g., SIB19) with satSwitchWithResync;

Upon, when, or in response to triggering/starting a procedure of the PCI unchanged switch and/or satellite switch;

Upon, when, before, after, or in response to t-Service;

Upon, when, before, after, or in response to performing DL synchronization;

Upon, when, after, or in response to stopping the UL synchronization timer;

If (at least) or in response to the target satellite information is available or has been received/acquired; and/or If (at least) or in response to not considering the UL synchronization timer as expired.

The UE may stop the UL synchronization timer when the UL synchronization timer is running (e.g., based on a source satellite information). The UE may start the UL synchronization timer when the UL synchronization timer is not running. The UE may restart the UL synchronization timer when the UL synchronization timer is running.

The UE may stop the UL synchronization timer (e.g., T430) at, before, or after the specific timing based on, in response to, or if (at least) the condition is fulfilled. The UE may not stop the UL synchronization timer (e.g., T430) at, before, or after the specific timing based on, in response to, or if (at least) the condition is not fulfilled. The UE may (re)start the UL synchronization timer (e.g., T430) after or in response to stopping the UL synchronization timer (e.g., T430). For example, the UE may receive an SIB19 comprising an indication of the satellite switch and (at least) an NTN information for the target satellite. The UE may start a procedure of the PCI unchanged switch and/or satellite switch. The UE may perform DL synchronization to the target satellite. The UE may stop a UL synchronization timer (e.g., T430) before or after performing DL synchronization to the target satellite. The UE may (re)start the UL synchronization timer (e.g., T430) based on the NTN information for the target satellite, after stopping the UL synchronization timer (e.g., T430).

The UE may stop the UL synchronization timer (e.g., T430) at an indicated timing. The indicating timing may be included in a system information (e.g., SIB19). The UE may stop the UL synchronization timer (e.g., T430) upon t-service. After stopping the UL synchronization timer (e.g., T430), the UE may consider UL synchronization is lost. In response to UL synchronization loss due to a satellite switch, the UE determines not to flush HARQ buffer(s). After the satellite switch, the UE could continue the transmissions before the satellite switch. The transmission efficiency could be improved.

For example, the UE may receive a system information (e.g., via a serving cell), wherein the system information includes at least a first NTN configuration, a time information, and an indication for a satellite switch. The system information may be SIB19. The indication for the satellite switch may be satSwitchWithResync. The time information may be t-Service. The time information may indicate when an NTN cell (e.g., the serving cell) is going to stop serving an area it is currently covering. The first NTN configuration may be NTN-Config (for serving cell, for the cell receiving the system information). The first NTN configuration may include at least a first validity duration and a first epoch time. The UE may start or restart a timer based on the first NTN configuration, in response to receiving the system information. The timer may be a UL synchronization timer and/or a validity timer. The timer may be T430. The UE may start or restart the timer with a timer value set to the first validity duration from a subframe indicated by the first epoch time. The UE may initiate a procedure of a satellite switch based on the indication for the satellite switch is included in the system information. The UE may stop the timer upon a timing indicated by the time information. The UE may consider UL synchronization is lost, after stopping the timer. The UE may determine whether to flush HARQ buffer(s) based on whether the UL synchronization is lost due to the satellite switch. The UE may not flush HARQ buffer(s) if and/or based on (at least) the UL synchronization is lost due to the satellite switch. The UE may perform DL synchronization with a cell served by a (target) satellite, e.g., indicated in the indication for the satellite switch. The UE may start the timer based on a second NTN configuration including in the indication for the satellite switch, after performing the DL synchronization. The second NTN configuration may be NTN-Config (for the target satellite, for the cell served by the target satellite). The second NTN configuration may include at least a second validity duration and a second epoch time. The UE may start the timer with a timer value set to the second validity duration from a subframe indicated by the second epoch time. The UE may consider the UL synchronization is obtained, after starting the timer.

Figure 24:
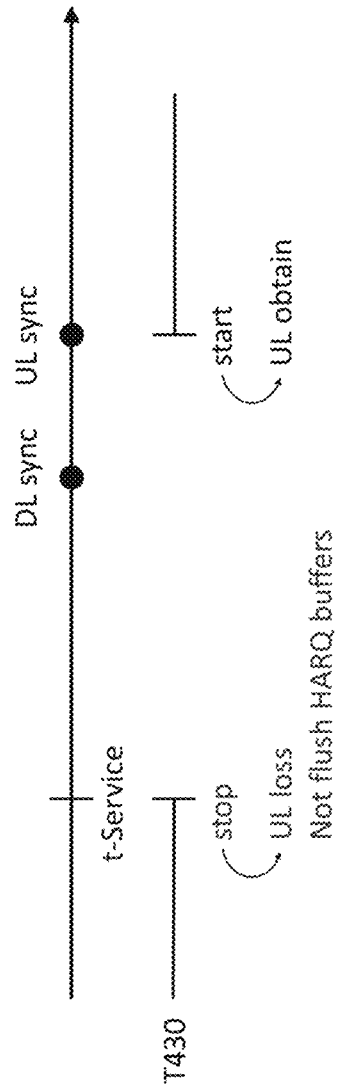
FIG. 24 is an example diagram of UL synchronization handling for satellite switching, in accordance with embodiments of the present invention.

For example, as shown in FIG. 24, the UE may initiate a satellite switch procedure based on an indication for a satellite switch (e.g., satSwitchWithResync) is received in a system information (e.g., SIB19). The UE may stop a timer (e.g., T430) upon a timing indicated by a time information (e.g., t-Service) in the system information (e.g., SIB19). In response to stopping the timer (e.g., T430), the UL may consider UL synchronization is lost and/or stop UL transmission on a serving cell. The UE may not flush HARQ buffer(s), e.g., in response to stopping the timer (e.g., T430), considering UL synchronization lost due to the satellite switch, UL synchronization loss due to the satellite switch, stopping UL transmission. The UE may perform DL synchronization (e.g., read SSB of the target satellite and/or the cell served by the target satellite). The UL may start the timer (e.g., T430), e.g., after DL synchronization. In response to starting the timer (e.g., T430), the UE may consider the UL synchronization is obtained and/or perform UL transmission on the serving cell.

Moreover, the UE may not start or restart the UL synchronization timer (e.g., T430) when, upon, or in response to receiving the NTN information for the target satellite. The UE may start or restart the UL synchronization timer (e.g., T430) based on NTN information for source satellite upon receiving SIB19. The UE may not start or restart the UL synchronization timer (e.g., T430) based on NTN information for the target satellite upon receiving SIB19. The UE may receive a first NTN information and a second NTN information via an SIB19. The UE may start or restart the UL synchronization timer (e.g., T430) based on the first NTN information and not based on the second NTN information (in response to receiving the SIB19). The UE may not start or restart the UL synchronization timer (e.g., T430) (in response to receiving the SIB19). The first NTN information is for the source satellite and/or the serving cell. The second NTN information is for the target satellite. The second NTN information is for the serving cell, target cell, or neighbor cell.

For the methods, alternatives, concepts, examples, and embodiments detailed above and herein, the following aspects and embodiments are possible.

Figure 25:
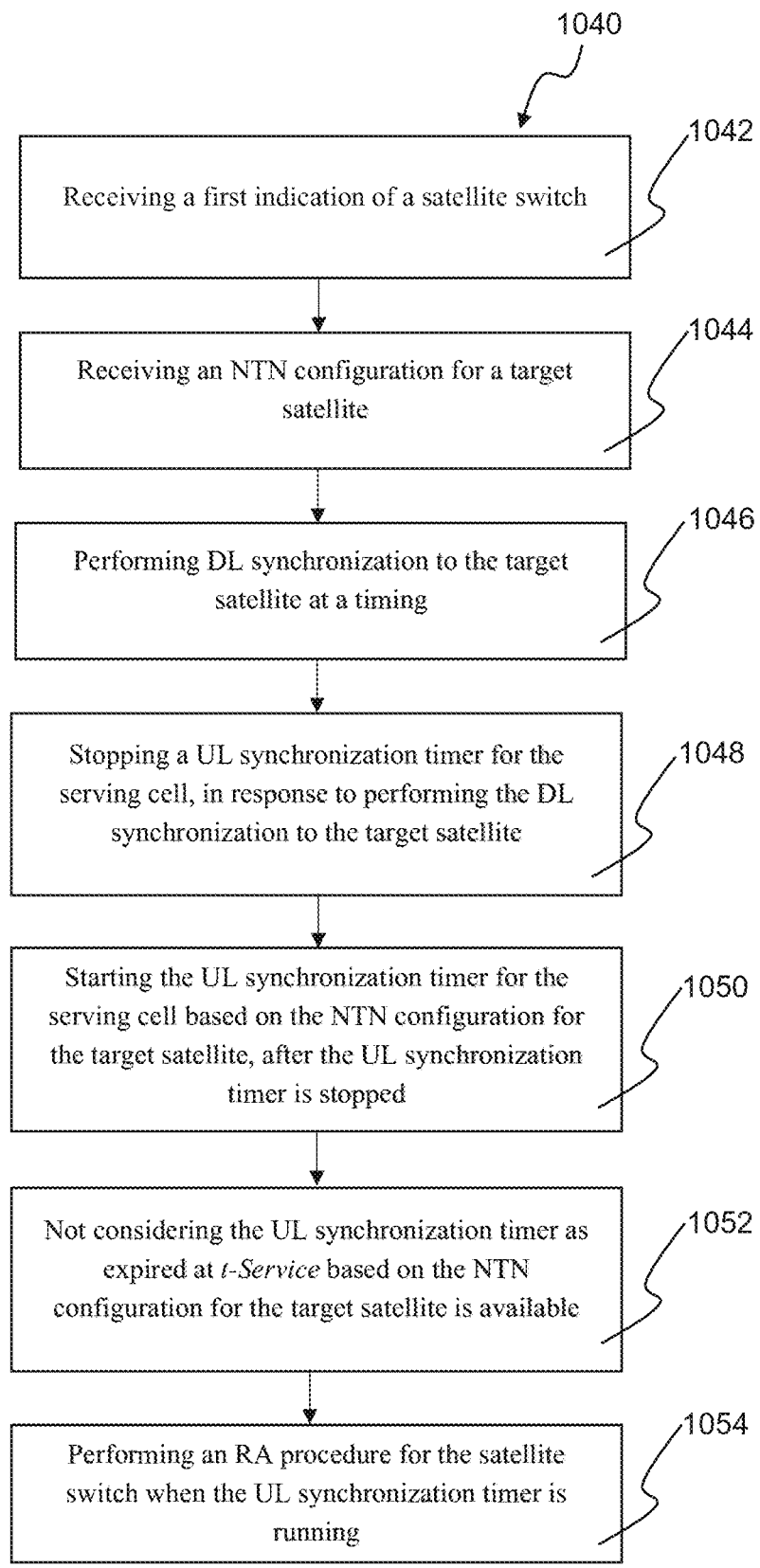
FIG. 25 is a flow diagram of a method of a UE comprising receiving a first indication of a satellite switch, receiving an NTN configuration for a target satellite, performing DL synchronization to the target satellite at a timing, stopping a UL synchronization timer for the serving cell, in response to performing the DL synchronization to the target satellite, starting the UL synchronization timer for the serving cell based on the NTN configuration for the target satellite, after the UL synchronization timer is stopped, not considering the UL synchronization timer as expired at t-Service based on the NTN configuration for the target satellite is available, and performing an RA procedure for the satellite switch when the UL synchronization timer is running.

Referring to FIG. 25, with this and other concepts, systems, and methods of the present invention, a method 1040 for UE in a wireless communication system comprises receiving a first indication of a satellite switch (step 1042), receiving an NTN configuration for a target satellite (step 1044), performing DL synchronization to the target satellite at a timing (step 1046), stopping a UL synchronization timer for the serving cell, in response to performing the DL synchronization to the target satellite (step 1048), starting the UL synchronization timer for the serving cell based on the NTN configuration for the target satellite, after the UL synchronization timer is stopped (step 1050), not considering the UL synchronization timer as expired at t-Service based on the NTN configuration for the target satellite is available (step 1052), and performing an RA procedure for the satellite switch when the UL synchronization timer is running (step 1054).

In various embodiments, the timing is indicated by t-Service or a timing between t-Start and t-Serving.

In various embodiments, the first indication is satSwitchWithReSync.

In various embodiments, the first indication and the NTN configuration for the target satellite are received in an SIB19.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a first indication of a satellite switch; (ii) receive an NTN configuration for a target satellite; (iii) perform DL synchronization to the target satellite at a timing; (iv) stop a UL synchronization timer for the serving cell, in response to performing the DL synchronization to the target satellite; (v) start the UL synchronization timer for the serving cell based on the NTN configuration for the target satellite, after the UL synchronization timer is stopped; (vi) not consider the UL synchronization timer as expired at t-Service based on the NTN configuration for the target satellite is available; and (vii) perform an RA procedure for the satellite switch when the UL synchronization timer is running. Moreover, the CPU 308 can execute the program code 312 to perform all of the described actions, steps, and methods described above, below, or otherwise herein.

Figure 26:
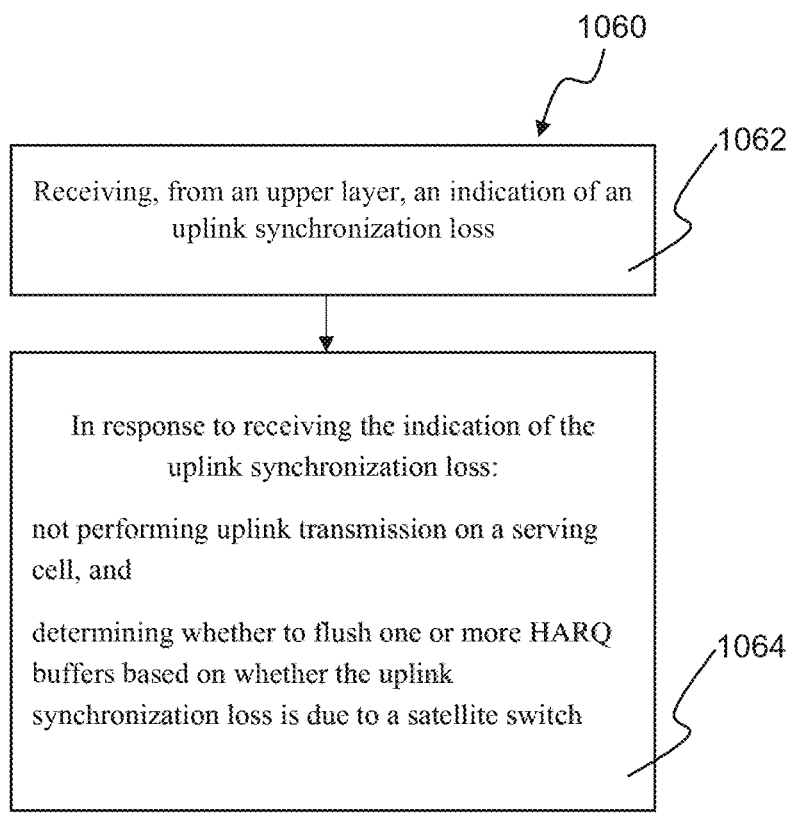
FIG. 26 is a flow diagram of a method of a UE comprising receiving, from an upper layer, an indication of an uplink synchronization loss, and in response to receiving the indication of the uplink synchronization loss: not performing uplink transmission on a serving cell, and determining whether to flush one or more HARQ buffers based on whether the uplink synchronization loss is due to a satellite switch.

Referring to FIG. 26, with this and other concepts, systems, and methods of the present invention, a method 1060 for UE in a wireless communication system comprises receiving, from an upper layer, an indication of an uplink synchronization loss (step 1062), and in response to receiving the indication of the uplink synchronization loss: not performing uplink transmission on a serving cell, and determining whether to flush one or more HARQ buffers based on whether the uplink synchronization loss is due to a satellite switch (step 1064).

In various embodiments, the method further comprises not flushing the one or more HARQ buffers if the uplink synchronization loss is due to the satellite switch, and flushing the one or more HARQ buffers if the uplink synchronization loss is not due to the satellite switch.

In various embodiments, the method further comprises receiving a system information, wherein the system information includes at least an indication for a satellite switch, initiating a procedure of satellite switch based on the indication for the satellite switch being included in the system information, and indicating the uplink synchronization loss, in response to initiating the procedure of the satellite switch.

In various embodiments, the indication for the satellite switch is satSwitchWithResync.

In various embodiments, the system information is SIB19.

In various embodiments, the method further comprises starting or restarting a timer upon receiving a system information, and indicating the uplink synchronization loss, in response to expiry of the timer.

In various embodiments, the timer is T430.

In various embodiments, the upper layer is a RRC layer.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive, from an upper layer, an indication of an uplink synchronization loss; and (ii) in response to receiving the indication of the uplink synchronization loss: not perform uplink transmission on a serving cell, and determine whether to flush one or more HARQ buffers based on whether the uplink synchronization loss is due to a satellite switch. Moreover, the CPU 308 can execute the program code 312 to perform all of the described actions, steps, and methods described above, below, or otherwise herein.

Figure 27:
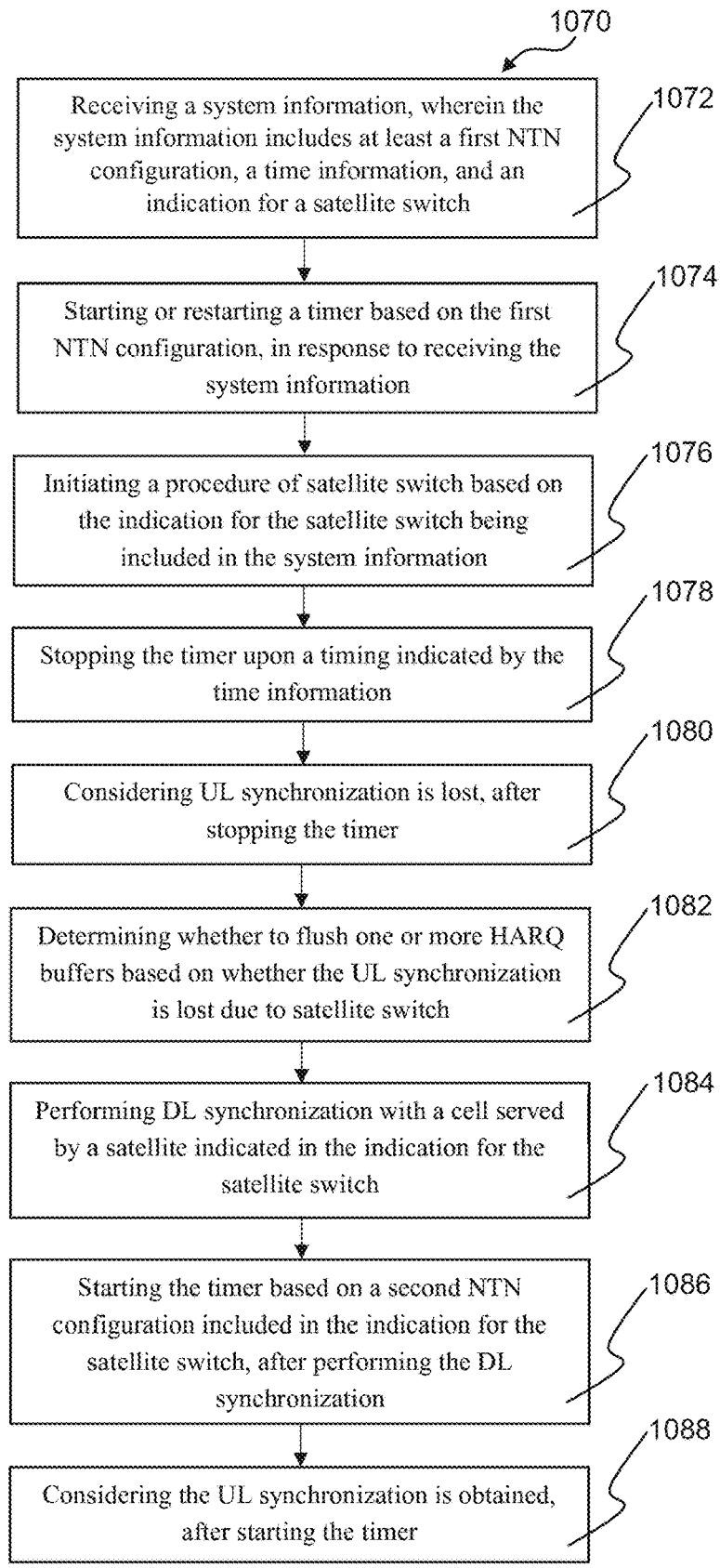
FIG. 27 is a flow diagram of a method of a UE comprising receiving a system information, wherein the system information includes at least a first NTN configuration, a time information, and an indication for a satellite switch, starting or restarting a timer based on the first NTN configuration, in response to receiving the system information, initiating a procedure of satellite switch based on the indication for the satellite switch being included in the system information, stopping the timer upon a timing indicated by the time information, considering UL synchronization is lost, after stopping the timer, determining whether to flush one or more HARQ buffers based on whether the UL synchronization is lost due to satellite switch, performing DL synchronization with a cell served by a satellite indicated in the indication for the satellite switch, starting the timer based on a second NTN configuration included in the indication for the satellite switch, after performing the DL synchronization, and considering the UL synchronization is obtained, after starting the timer.

Referring to FIG. 27, with this and other concepts, systems, and methods of the present invention, a method 1070 for UE in a wireless communication system comprises receiving a system information, wherein the system information includes at least a first NTN configuration, a time information, and an indication for a satellite switch (step 1072), starting or restarting a timer based on the first NTN configuration, in response to receiving the system information (step 1074), initiating a procedure of satellite switch based on the indication for the satellite switch being included in the system information (step 1076), stopping the timer upon a timing indicated by the time information (step 1078), considering UL synchronization is lost, after stopping the timer (step 1080), determining whether to flush one or more HARQ buffers based on whether the UL synchronization is lost due to satellite switch (step 1082), performing DL synchronization with a cell served by a satellite indicated in the indication for the satellite switch (step 1084), starting the timer based on a second NTN configuration included in the indication for the satellite switch, after performing the DL synchronization (step 1086), and considering the UL synchronization is obtained, after starting the timer (step 1088).

In various embodiments, the time information indicates when an NTN cell is going to stop serving an area the NTN cell is currently covering.

In various embodiments, the system information is SIB19.

In various embodiments, the time information is t-Service.

In various embodiments, the indication for the satellite switch is satSwitchWithResync.

In various embodiments, the first NTN configuration and/or the second NTN configuration is NTN-Config.

In various embodiments, the first NTN configuration includes at least a first validity duration and a first epoch time, and/or the second NTN configuration includes at least a second validity duration and a second epoch time.

In various embodiments, the timer is T430.
In various embodiments, the UE starts or restarts the timer with a timer value set to the first validity duration from a subframe indicated by the first epoch time, and/or the UE starts the timer with a timer value set to the second validity duration from a subframe indicated by the second epoch time.

In various embodiments, the second NTN configuration is associated with the cell served by the satellite indicated in the indication for the satellite switch.

In various embodiments, the method further comprises not flushing the one or more HARQ buffers if the uplink synchronization loss is due to the satellite switch, and flushing the one or more HARQ buffers if the uplink synchronization loss is not due to the satellite switch.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a system information, wherein the system information includes at least a first NTN configuration, a time information, and an indication for a satellite switch; (ii) start or restart a timer based on the first NTN configuration, in response to receiving the system information; (iii) initiate a procedure of satellite switch based on the indication for the satellite switch being included in the system information; (iv) stop the timer upon a timing indicated by the time information; (v) consider UL synchronization is lost, after stopping the timer; (vi) determine whether to flush one or more HARQ buffers based on whether the UL synchronization is lost due to satellite switch; (vii) perform DL synchronization with a cell served by a satellite indicated in the indication for the satellite switch; (viii) start the timer based on a second NTN configuration included in the indication for the satellite switch, after performing the DL synchronization; and (ix) consider the UL synchronization is obtained, after starting the timer. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
receiving, from an upper layer, an indication of an uplink synchronization loss; and
in response to receiving the indication of the uplink synchronization loss:
not performing uplink transmission on a serving cell; and
determining whether to flush one or more Hybrid Automatic Repeat Request (HARQ) buffers based on whether the uplink synchronization loss is due to a satellite switch.

2. The method of claim 1, further comprising:
not flushing the one or more HARQ buffers if at least the uplink synchronization loss is due to the satellite switch; and
flushing the one or more HARQ buffers if at least the uplink synchronization loss is not due to the satellite switch.

3. The method of claim 1, further comprising:
receiving a system information, wherein the system information includes at least an indication for a satellite switch;
initiating a procedure of satellite switch based on the indication for the satellite switch being included in the system information; and
indicating the uplink synchronization loss, in response to initiating the procedure of the satellite switch.

4. The method of claim 3, wherein the indication for the satellite switch is satSwitchWithResync and/or the system information is SIB19.

5. The method of claim 1, further comprising:
starting or restarting a timer upon receiving a system information; and
indicating the uplink synchronization loss, in response to expiry of the timer.

6. The method of claim 5, wherein the timer is T430 and/or the system information is SIB19.

7. A method of a User Equipment (UE), comprising:
receiving a system information, wherein the system information includes at least a first Non-Terrestrial Network (NTN) configuration, a time information, and an indication for a satellite switch;
starting or restarting a timer based on the first NTN configuration, in response to receiving the system information;
initiating a procedure of satellite switch based on the indication for the satellite switch being included in the system information;
stopping the timer upon a timing indicated by the time information;
considering Uplink (UL) synchronization is lost, after stopping the timer;
determining whether to flush one or more Hybrid Automatic Repeat Request (HARQ) buffers based on whether the UL synchronization is lost due to satellite switch;
performing Downlink (DL) synchronization with a cell served by a satellite indicated in the indication for the satellite switch;
starting the timer based on a second NTN configuration included in the indication for the satellite switch, after performing the DL synchronization; and
considering the UL synchronization is obtained, after starting the timer.

8. The method of claim 7, wherein the time information indicates when an NTN cell is going to stop serving an area the NTN cell is currently covering and/or the time information is t-Service.

9. The method of claim 7, wherein the first NTN configuration includes at least a first validity duration and a first epoch time, and/or the second NTN configuration includes at least a second validity duration and a second epoch time.

10. The method of claim 9, wherein the UE starts or restarts the timer with a timer value set to the first validity duration from a subframe indicated by the first epoch time, and/or the UE starts the timer with a timer value set to the second validity duration from a subframe indicated by the second epoch time.

11. A User Equipment (UE), comprising:
a memory; and
a processor operatively coupled with the memory, wherein the processor is configured to execute a program code to:
  receive, from an upper layer, an indication of an uplink synchronization loss;
  in response to receiving the indication of the uplink synchronization loss:
    not perform uplink transmission on a serving cell; and
    determine whether to flush one or more Hybrid Automatic Repeat Request (HARQ) buffers based on whether the uplink synchronization loss is due to a satellite switch.

12. The UE of claim 11, wherein the processor is further configured to execute the program code to:
not flush the one or more HARQ buffers if at least the uplink synchronization loss is due to the satellite switch; and
flush the one or more HARQ buffers if at least the uplink synchronization loss is not due to the satellite switch.

13. The UE of claim 11, wherein the processor is further configured to execute the program code to:
receive a system information, wherein the system information includes at least an indication for a satellite switch;
initiate a procedure of satellite switch based on the indication for the satellite switch being included in the system information; and
indicate the uplink synchronization loss, in response to initiating the procedure of the satellite switch.

14. The UE of claim 13, wherein the indication for the satellite switch is satSwitchWithResync and/or the system information is SIB19.

15. The UE of claim 11, wherein the processor is further configured to execute the program code to:
start or restart a timer upon receiving a system information; and
indicate the uplink synchronization loss, in response to expiry of the timer.

16. The UE of claim 15, wherein the timer is T430 and/or the system information is SIB19.

* * * * *